US012562126B2

(12) United States Patent
Lee et al.

(10) Patent No.: US 12,562,126 B2
(45) Date of Patent: Feb. 24, 2026

(54) DISPLAY PANEL AND ELECTRONIC APPARATUS INCLUDING THE SAME

(71) Applicant: SAMSUNG DISPLAY CO., LTD., Yongin-si (KR)

(72) Inventors: Bongwon Lee, Yongin-si (KR); Daesuk Kim, Yongin-si (KR); Yanghee Kim, Yongin-si (KR); Hyunchol Bang, Yongin-si (KR); Youngsoo Yoon, Yongin-si (KR); Ilgoo Youn, Yongin-si (KR); Soyoung Lee, Yongin-si (KR); Sukyo Jung, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/007,050

(22) Filed: Dec. 31, 2024

(65) Prior Publication Data

US 2025/0140200 A1 May 1, 2025

Related U.S. Application Data

(60) Division of application No. 18/520,036, filed on Nov. 27, 2023, now Pat. No. 12,205,549, which is a (Continued)

(30) Foreign Application Priority Data

Jan. 25, 2022 (KR) ........................ 10-2022-0011045

(51) Int. Cl.
*G09G 3/3258* (2016.01)

(52) U.S. Cl.
CPC ... *G09G 3/3258* (2013.01); *G09G 2300/0819* (2013.01); *G09G 2300/0842* (2013.01); *G09G 2320/0626* (2013.01)

(58) Field of Classification Search
CPC ......... G09G 2300/0426; G09G 3/3233; G09G 3/3258; G09G 2300/0452
See application file for complete search history.

(56) References Cited

U.S. PATENT DOCUMENTS 6,832,951 B2 12/2004 Park
6,835,951 B2 12/2004 Park
(Continued)

FOREIGN PATENT DOCUMENTS

KR 100763171 B1 10/2007
KR 1020180000771 A 1/2018
(Continued)

OTHER PUBLICATIONS

JP2005046352A Display Apparatus With Hole Habara Takaaki ·Feb. 24, 2005 (Year: 2003).*

*Primary Examiner* — Van N Chow
(74) *Attorney, Agent, or Firm* — CANTOR COLBURN LLP

(57) ABSTRACT

A display panel includes: a transmissive area surrounded by a display area; first and second data lines each including a first part and a second part that are apart from each other with the transmissive area therebetween; first and second bridge lines in the display area and disposed opposite sides of the transmissive area, the first bridge line electrically connecting the first part and the second part of the first data line to each other, the second bridge line electrically connecting the first part and the second part of the second data line to each other; first and second vertical conductive lines in the display area; a first horizontal conductive line electrically connected to the first vertical conductive line; and a second horizontal conductive line electrically connected to the second vertical conductive line.

11 Claims, 15 Drawing Sheets

Related U.S. Application Data continuation of application No. 17/953,775, filed on Sep. 27, 2022, now Pat. No. 11,854,485.

(56) References Cited

U.S. PATENT DOCUMENTS

| | | | | |
|---|---|---|---|---|
| 10,249,698 | B2 | 4/2019 | Han | |
| 10,879,332 | B2 | 12/2020 | Gu et al. | |
| 11,177,337 | B2 * | 11/2021 | Seo | G09G 3/3225 |
| 2011/0096018 | A1 | 4/2011 | Lee et al. | |
| 2017/0193876 | A1 * | 7/2017 | Choi | H10K 59/131 |
| 2020/0058728 | A1 | 2/2020 | Song et al. | |
| 2020/0411625 | A1 | 12/2020 | Seo et al. | |
| 2021/0064187 | A1 * | 3/2021 | Lee | G06F 3/0446 |
| 2022/0197438 | A1 | 6/2022 | Sun et al. | |
| 2022/0206614 | A1 | 6/2022 | Lee et al. | |
| 2023/0255058 | A1 * | 8/2023 | Kim | H10D 86/60 257/40 |
| 2024/0087534 | A1 * | 3/2024 | Lee | G09G 3/3233 |

FOREIGN PATENT DOCUMENTS

| | | | |
|---|---|---|---|
| KR | 1020200021029 | A | 2/2020 |
| KR | 1020210000799 | A | 1/2021 |

* cited by examiner

DISPLAY PANEL AND ELECTRONIC APPARATUS INCLUDING THE SAME

This application is a divisional of U.S. patent application Ser. No. 18/520,036, filed on Nov. 27, 2023, which is a continuation of U.S. patent application Ser. No. 17/953,775, filed on Sep. 27, 2022, which claims priority to Korean Patent Application No. 10-2022-0011045, filed on Jan. 25, 2022, and all the benefits accruing therefrom under 35 U.S.C. § 119, the content of which in its entirety is herein incorporated by reference.

BACKGROUND

1. Field

One or more embodiments relate to a display panel and an electronic apparatus including the display panel.

2. Description of the Related Art

In a display panel, such as an organic light-emitting display panel, transistors are typically arranged in a display area to control brightness and the like of a light-emitting diode. The transistors are configured to control a corresponding light-emitting diode to emit light of a preset color by using a data signal, a driving voltage, and a common voltage transferred thereto.

A data driving circuit, a driving voltage supply line, a common voltage supply line, and the like may be arranged in a non-display area outside the display area to provide data signals, a driving voltage, a common voltage, and the like.

SUMMARY

One or more embodiments include a display apparatus which may provide high-quality images, and an electronic apparatus including the display apparatus.

According to one or more embodiments, a display panel includes a transmissive area, a display area surrounding the transmissive area, a first data line including a first part and a second part, where the first part and the second part of the first data line each extend in a first direction in the display area and are apart from each other with the transmissive area therebetween, a second data line including a first part and a second part, where the first part and the second part of the second data line each extend in the first direction in the display area and are apart from each other with the transmissive area therebetween, a first bridge line disposed in the display area, electrically connecting the first part of the first data line to the second part of the first data line, and disposed on one side of the transmissive area, a second bridge line disposed in the display area, electrically connecting the first part of the second data line to the second part of the second data line, and disposed on another side of the transmissive area, a first vertical conductive line disposed in the display area and extending in the first direction, a second vertical conductive line disposed opposite the first vertical conductive line with the transmissive area therebetween, a first horizontal conductive line electrically connected to the first vertical conductive line, and disposed between a first end of the first bridge line and a first end of the second bridge line in the display area, and a second horizontal conductive line electrically connected to the second vertical conductive line and disposed between a second end of the first bridge line and a second end of the second bridge line in the display area.

In an embodiment, two opposite ends of the first horizontal conductive line may be respectively adjacent to a connection point between the first end of the first bridge line and the first part of the first data line, and a connection point between the first end of the second bridge line and the first part of the second data line.

In an embodiment, two opposite ends of the second horizontal conductive line may be respectively adjacent to a connection point between the second end of the first bridge line and the second part of the first data line, and a connection point between the second end of the second bridge line and the second part of the second data line.

In an embodiment, each of a connection point between the first end of the first bridge line and the first part of the first data line, a connection point between the first end of the second bridge line and the first part of the second data line, a connection point between the second end of the first bridge line and the second part of the first data line, and a connection point between the second end of the second bridge line and the second part of the second data line may be disposed in the display area.

In an embodiment, each of the first bridge line and the second bridge line may include a vertical bridge part extending in the first direction, and a pair of horizontal bridge parts respectively adjacent to two opposite ends of the vertical bridge part and extending in a second direction crossing the first direction.

In an embodiment, the vertical bridge part and the pair of horizontal bridge parts may be disposed in different layers from each other.

In an embodiment, the vertical bridge part may be disposed in a same layer as at least one selected from the first data line and the second data line.

In an embodiment, the display panel may further include a plurality of sub-pixel circuits disposed in the display area and each including transistors, a plurality of light-emitting diodes electrically connected to the plurality of sub-pixel circuits, respectively, a plurality of driving voltage lines which provides a driving voltage to a corresponding one of the plurality of sub-pixel circuits, and a plurality of common voltage lines which provides a common voltage to an electrode of the plurality of light-emitting diodes.

In an embodiment, at least one selected from the first vertical conductive line and the second vertical conductive line may have a same voltage level as a voltage level of the plurality of driving voltage lines or the plurality of common voltage lines.

In an embodiment, the display panel may further include a plurality of initialization voltage lines each electrically connected to a transistor included in a corresponding one of the plurality of sub-pixel circuits, where at least one selected from the plurality of first vertical conductive line and the second vertical conductive line may have a same voltage level as a voltage level of one of the initialization voltage lines.

In an embodiment, the display panel may further include a third data line including a first part and a second part, where the first part and the second part of the third data line each extend in the first direction in the display area and are apart from each other with the transmissive area therebetween, a fourth data line including a first part and a second part, where the first part and the second part of the fourth data line each extend in the first direction in the display area and are apart from each other with the transmissive area therebetween, a third bridge line disposed in the display area, electrically connecting the first part of the third data line to the second part of the third data line, and disposed on one side of the transmissive area, a fourth bridge line disposed in the display area, electrically connecting the first part of the fourth data line to the second part of the fourth data line, and disposed on another side of the transmissive area, a third horizontal conductive line disposed between a first end of the third bridge line and a first end of the fourth bridge line in the display area, and a fourth horizontal conductive line disposed between a second end of the third bridge line and a second end of the fourth bridge line in the display area.

In an embodiment, the first horizontal conductive line and the third horizontal conductive line may be adjacent to each other in the first direction and may have different lengths from each other, and the second horizontal conductive line and the fourth horizontal conductive line may be adjacent to each other in the first direction and may have different lengths from each other.

According to one or more embodiments, an electronic apparatus includes a display panel including a transmissive area and a display area surrounding the transmissive area, and a component disposed below the display panel and corresponding to the transmissive area.

In such an embodiment, the display panel of the electronic apparatus includes a first data line including a first part and a second part, where the first part and the second part of the first data line each extend in a first direction in the display area and are apart from each other with the transmissive area therebetween, a first bridge line disposed in the display area, electrically connecting the first part of the first data line to the second part of the first data line, and including a vertical bridge part and a pair of horizontal bridge parts, where the vertical bridge part extends in the first direction, and the pair of horizontal bridge parts extend in a second direction crossing the first direction, and respectively disposed on two opposite ends of the vertical bridge part, a first vertical conductive line disposed in the display area and extending in the first direction, and a first horizontal conductive line adjacent to one of the pair of the horizontal bridge parts and electrically connected to the first vertical conductive line.

In an embodiment, each of a connection point between the first part of the first data line and the first bridge line, and a connection point between the second part of the first data line and the first bridge line, may be disposed in the display area.

In an embodiment, the display panel may further include a second vertical conductive line disposed in the display area and extending in the first direction, and a second horizontal conductive line which is adjacent to the other of the pair of horizontal bridge parts in the display area, and which is electrically connected to the second vertical conductive line.

In an embodiment, the first horizontal conductive line may be disposed opposite the second horizontal conductive line with the transmissive area therebetween.

In an embodiment, the display panel may further include a third horizontal conductive line adjacent to the first horizontal conductive line and electrically connected to the first vertical conductive line, where the first horizontal conductive line and the third horizontal conductive line may have different lengths from each other.

In an embodiment, the display panel may further include a fourth horizontal conductive line adjacent to the second horizontal conductive line and electrically connected to the second vertical conductive line, where the second horizontal conductive line and the fourth horizontal conductive line may have different lengths from each other.

In an embodiment, the display panel may further include a plurality of sub-pixel circuits disposed in the display area and each including transistors, a plurality of light-emitting diodes electrically connected to the plurality of sub-pixel circuits, respectively, a plurality of driving voltage lines which provides a driving voltage to a corresponding one of the plurality of sub-pixel circuits, a plurality of common voltage lines which provides a common voltage to an electrode of the plurality of light-emitting diodes, and a plurality of initialization voltage lines which provides an initialization voltage to the plurality of sub-pixel circuits.

In an embodiment, at least one selected from the first vertical conductive line and the second vertical conductive line may have a same voltage level as a voltage level of one selected from the plurality of driving voltage lines, the plurality of common voltage lines, and the plurality of initialization voltage lines.

In an embodiment, the vertical bridge part and the pair of horizontal bridge parts of the first bridge line may be disposed in different layers from each other, and the vertical bridge part may be electrically connected to the pair of horizontal bridge parts, respectively, through contact holes.

In an embodiment, the component may include a sensor or a camera.

According to one or more embodiments, an electronic apparatus includes a display panel including a transmissive area and a display area surrounding the transmissive area, and a component disposed below the display panel and corresponding to the transmissive area, where the display panel includes a first data line including a first part and a second part, where the first part and the second part of the first data line each extend in a first direction in the display area and are apart from each other with the transmissive area therebetween, a first bridge line disposed in the display area, electrically connecting the first part of the first data line to the second part of the first data line, and including a vertical bridge part and a first horizontal bridge part, where the vertical bridge part extends in the first direction, and the first horizontal bridge part extends in a second direction crossing the first direction, and is adjacent to a first end of the vertical bridge part and the first part of the first data line, a driving voltage input part disposed outside the display area, a first vertical conductive line electrically connected to the driving voltage input part and extending in the first direction in the display area, and a first horizontal conductive line adjacent to the first horizontal bridge part in the display area and electrically connected to the first vertical conductive line, where the first horizontal conductive line and the first horizontal bridge part are disposed in a same layer as each other, and the first vertical conductive line and the first data line are disposed on an insulating layer on the first horizontal conductive line and the first horizontal bridge part.

In an embodiment, the display panel may further include a vertical driving voltage line electrically connected to the driving voltage input part and extending in the first direction in the display area, where the vertical driving voltage line may be disposed in a different layer from the first vertical conductive line.

In an embodiment, the first bridge line may further include a second horizontal bridge part extending in the second direction and adjacent to a second end of the vertical bridge part and the second part of the first data line.

In an embodiment, the first part of the first data line may be electrically connected to the first horizontal bridge part through a first contact hole defined in a portion of the insulating layer disposed between the first part of the first data line and the first horizontal bridge part, and the second part of the first data line may be electrically connected to the second horizontal bridge part through a second contact hole defined in a portion of the insulating layer disposed between the second part of the first data line and the second horizontal bridge part.

In an embodiment, the first vertical conductive line may be connected to the first horizontal conductive line through a contact hole defined in a portion of the insulating layer disposed between the first vertical conductive line and the first horizontal conductive line.

In an embodiment, the display panel may further include a second vertical conductive line disposed opposite the first vertical conductive line with the transmissive area therebetween and extending in the first direction, and a second horizontal conductive line which is adjacent to the second horizontal bridge part in the display area, and which is electrically connected to the second vertical conductive line.

In an embodiment, the display panel may further include a third horizontal conductive line adjacent to the first horizontal conductive line and electrically connected to the first vertical conductive line, where the first horizontal conductive line and the third horizontal conductive line may have different lengths from each other.

In an embodiment, the first horizontal conductive line and the third horizontal conductive line may be disposed in a same layer as each other.

In an embodiment, the display panel may further include a fourth horizontal conductive line adjacent to the second horizontal conductive line and electrically connected to the second vertical conductive line, where the second horizontal conductive line and the fourth horizontal conductive line may have different lengths from each other.

In an embodiment, the second horizontal conductive line and the fourth horizontal conductive line may be disposed in a same layer as each other.

BRIEF DESCRIPTION OF THE DRAWINGS

The above and other features of certain embodiments of the disclosure will be more apparent from the following description taken in conjunction with the accompanying drawings, in which.

DETAILED DESCRIPTION

Figure 1A:
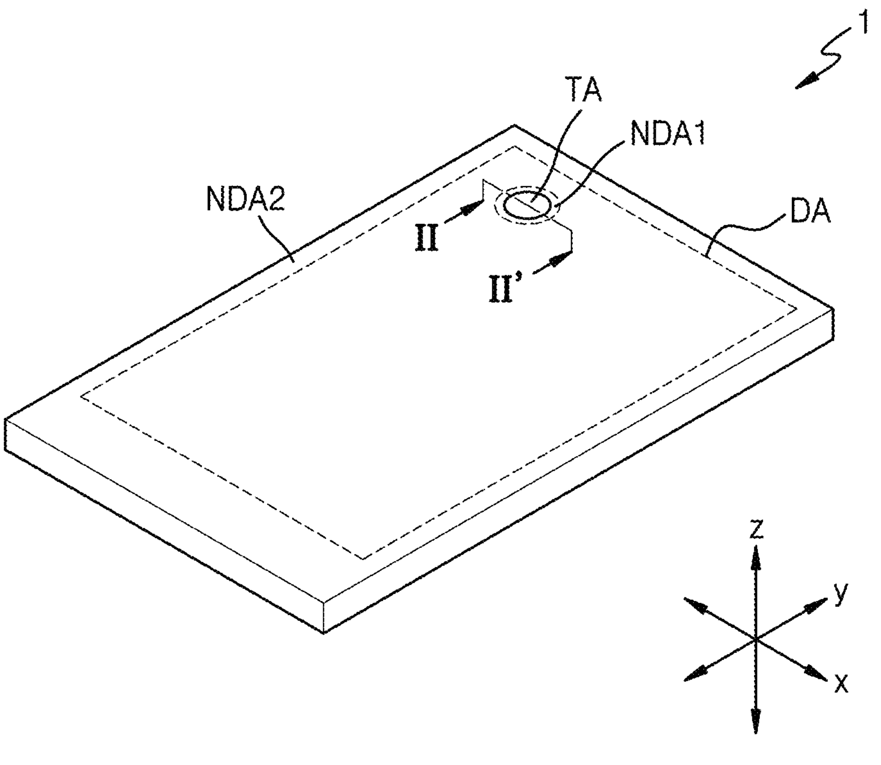
FIGS. 1A and 1B are schematic perspective views of an electronic apparatus according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. Throughout the disclosure, the expression "at least one of a, b and c" or "at least one selected from a, b and c" indicates only a, only b, only c, both a and b, both a and c, both b and c, all of a, b, and c, or variations thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

As the present disclosure allows for various changes and numerous embodiments, certain embodiments will be illustrated in the drawings and described in the written description. Effects and features of the disclosure, and methods for achieving them will be clarified with reference to embodiments described below in detail with reference to the drawings. However, the disclosure is not limited to the following embodiments and may be embodied in various forms.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments will be described with reference to the accompanying drawings.

Sizes of elements in the drawings may be exaggerated or reduced for convenience of explanation. For example, since sizes and thicknesses of elements in the drawings are arbitrarily illustrated for convenience of explanation, the disclosure is not limited thereto.

The x-axis, the y-axis and the z-axis are not limited to three axes of the rectangular coordinate system, and may be interpreted in a broader sense. For example, the x-axis, the y-axis, and the z-axis may be perpendicular to one another, or may represent different directions that are not perpendicular to one another.

Figure 1B:
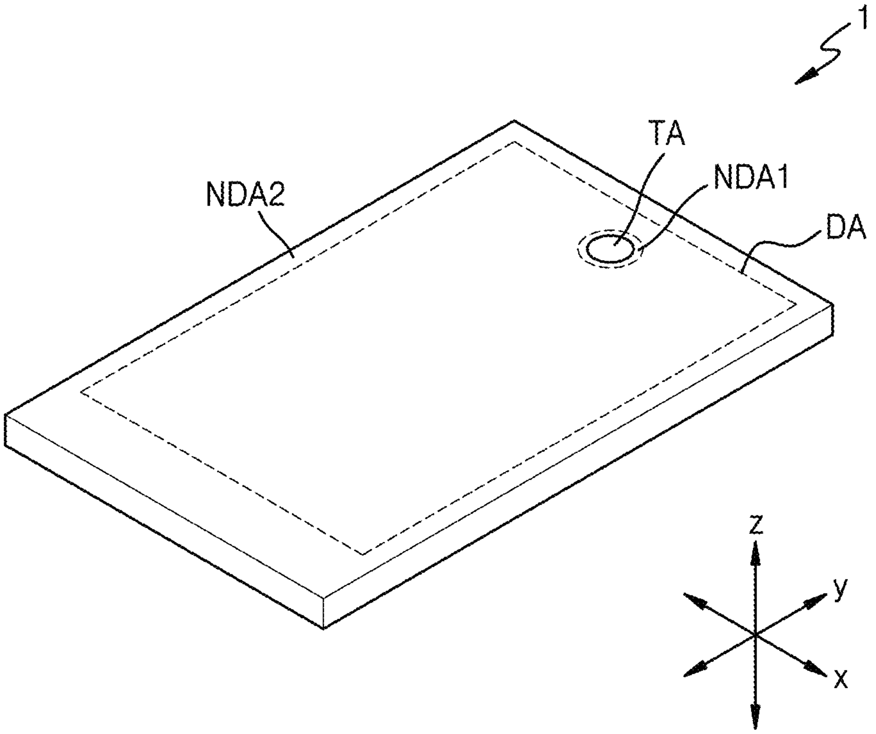

FIGS. 1A and 1B are schematic perspective views of an electronic apparatus according to an embodiment.

Referring to FIGS. 1A and 1B, an embodiment of an electronic apparatus 1 may include an apparatus for displaying moving images or still images and may be used as a display screen of various products including televisions, notebook computers, monitors, advertisement boards, Internet of things (IoT) as well as portable electronic apparatuses including mobile phones, smart phones, tablet personal computers (PC), mobile communication terminals, electronic organizers, electronic books, portable multimedia players (PMP), navigations, and ultra mobile personal computers (UMPC). In addition, the electronic apparatus 1 may be used in wearable devices including smartwatches, watchphones, glasses-type displays, and head-mounted displays (HMD). In addition, in an embodiment, the electronic apparatus 1 may be used as instrument panels for automobiles, center fascias for automobiles, or center information displays (CID) arranged on a dashboard, room mirror displays that replace side mirrors of automobiles, and displays arranged on the backside of front seats as entertainment for the back seats of automobiles. Hereinafter, for convenience of illustration and description, embodiments where the electronic apparatus 1 is used as a smartphone is shown in the drawings.

In a plan view of the present specification, "left," "right," "up," and "down" denote directions when the electronic apparatus 1 is viewed in a direction perpendicular to the electronic apparatus 1. For example, "left" denotes a −x direction, "right" denotes a +x direction, "up" denotes a +y direction, and "down" denotes a −y direction.

In an embodiment, the electronic apparatus 1 may have a rectangular shape in a plan view. In an embodiment, for example, as shown in FIGS. 1A and 1B, the electronic apparatus 1 may have a quadrangular shape having short sides in the x direction and long sides in the y direction in a plan view. A corner where the short side in the x direction meets the long side in the y direction may be round to have a preset curvature or formed to have a right angle. A planar shape of the electronic apparatus 1 is not limited to a rectangle, but may be other polygons, ellipses, or irregular shapes.

Figure 2:
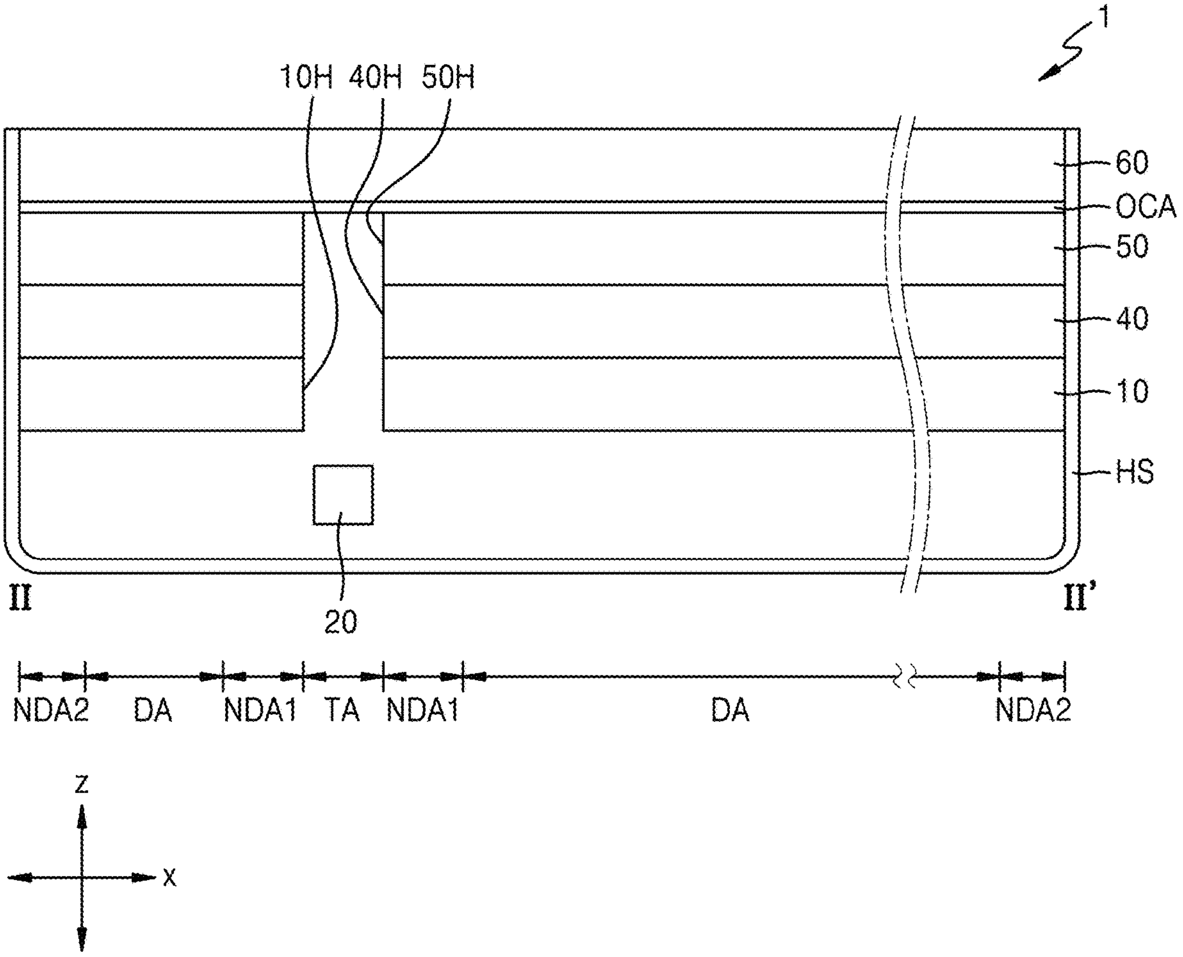
FIG. 2 is a cross-sectional view of an electronic apparatus according to an embodiment, taken along line II-II'.

The electronic apparatus 1 may include at least one transmissive area TA arranged inside a display area DA. The transmissive area TA may be surrounded by the display area DA entirely. The transmissive area TA is a region in which a component described below with reference to FIG. 2 is arranged. The electronic apparatus 1 may have various functions by using the component.

Though it is shown in FIG. 1A that the transmissive area TA is arranged on the upper left side, the embodiment is not limited thereto. In an alternative embodiment, the transmissive area TA may be arranged on the upper center, as shown in FIG. 1B. In another alternative embodiment, the transmissive area TA may be arranged on upper right side.

The display area DA may be configured to display images by using light emitted from a plurality of sub-pixels arranged in the display area DA. Each sub-pixel may include a display element that emits light of a preset color. In an embodiment, for example, display elements emitting red, green, or blue light may be arranged two-dimensionally in the x direction and the y direction, and the display area DA configured to display images may be defined.

A non-display area NDA is a region in which sub-pixels are not arranged, and may include a first non-display area NDA1 and a second non-display area NDA2, where the first non-display area NDA1 surrounds the transmissive area TA, and the second non-display area NDA2 surrounds the display area DA. The first non-display area NDA1 may be arranged between the transmissive area TA and the display area DA, and the second non-display area NDA2 may be arranged outside the display area DA.

FIG. 2 is a cross-sectional view of the electronic apparatus 1 according to an embodiment, taken along line II-II' of FIG. 1.

Referring to FIG. 2, an embodiment of the electronic apparatus 1 may include a housing HS with an open side and a space defined therein. The open side of the housing HS may be coupled to a window 60.

A display panel 10, an input sensing layer 40, and an optical functional layer 50 may be disposed below the window 60. A component 20 may be disposed below (e.g., on a rear side or lower surface of) the display panel 10.

The component 20 may be an electronic element that uses light or sound. The electronic element may be a sensor that measures a distance, such as a proximity sensor, a sensor that recognizes a portion of a user's body (e.g., a fingerprint, an iris, a face, and the like), a small lamp that outputs light, or a camera. The electronic element that uses light may use light in various wavelength bands, such as visible light, infrared light, or ultraviolet light. The electronic element that uses sound may use ultrasonic waves or sounds in different frequency bands from each other.

The display panel 10 may be configured to display images. The display panel 10 may display images by using the display elements arranged in the display area DA. The display panel 10 may be a light-emitting display panel including a light-emitting diode. The light-emitting diode may include an organic light-emitting diode including an organic emission layer. In an embodiment, the light-emitting diode may be an inorganic light-emitting diode including an inorganic material. The inorganic light-emitting diode may include a PN-junction diode including inorganic material semiconductor-based materials. When a forward voltage is applied to a PN-junction diode, holes and electrons are injected and energy created by recombination of the holes and the electrons is converted into light energy, and thus, light of a preset color may be emitted. The inorganic light-emitting diode may have a width in a range of several micrometers to hundreds of micrometers, or several nanometers to hundreds of nanometers. In an embodiment, the inorganic light-emitting diode may be denoted by a micro light-emitting diode.

The display panel 10 may be a rigid display panel that has rigidity and thus is not easily bent, or a flexible display panel that has flexibility and thus is easily bendable, foldable, or rollable. In an embodiment, for example, the display panel 10 may include a foldable display panel that is foldable, a curved display panel that has a curved display surface, a bendable display panel in which a region except a display surface is bent, a rollable display panel that is rollable and unrollable, or a stretchable display panel that is stretchable.

The input sensing layer 40 may obtain coordinate information corresponding to an external input, for example, a touch event. The input sensing layer 40 may include a sensing electrode (or a touch electrode) and trace lines connected to the sensing electrode. The input sensing layer 40 may be disposed on the display panel 10. The input sensing layer 40 may sense an external input by using a self-capacitance method and/or a mutual capacitance method.

The input sensing layer 40 may be directly formed on the display panel 10. In an embodiment, for example, the input sensing layer 40 may be successively formed after a process of forming the display panel 10. In such an embodiment, an adhesive layer may not be disposed between the input sensing layer 40 and the display panel 10. Alternatively, the input sensing layer 40 may be formed separately, and then, coupled by using an adhesive layer. The adhesive layer may include an optically clear adhesive.

The optical functional layer 50 may include an anti-reflection layer. The anti-reflection layer may reduce the reflectivity of light (external light) incident toward the display panel 10 from outside through the window 60. The anti-reflection layer may include a retarder and a polarizer.

In an alternative embodiment, the anti-reflection layer may include a black matrix and color filters. The color filters may be arranged by taking into account colors of light emitted respectively from the sub-pixels of the display panel 10. In another alternative embodiment, the anti-reflection layer may include a destructive interference structure. The destructive interference structure may include a first reflection layer and a second reflection layer respectively disposed on different layers. First-reflected light and second-reflected light respectively reflected by the first reflection layer and the second reflection layer may destructively interfere and thus the reflectivity of external light may be reduced.

The optical functional layer 50 may include a lens layer. The lens layer may improve a light output efficiency of light emitted from the display panel 10 or reduce color deviation. The lens layer may include a layer having a lens shape that is concave or convex, and/or a plurality of layers having different refractive indexes from each other. The optical functional layer 50 may include both the anti-reflection layer and the lens layer described above, or one of the anti-reflection layer and the lens layer.

The optical functional layer 50 may be coupled to the window 60 through an adhesive layer, such as an optically clear adhesive (OCA).

Each of the display panel 10, the input sensing layer 40, and the optical functional layer 50 may include a through hole located in the transmissive area TA, that is, a through hole is defined through each of the display panel 10, the input sensing layer 40, and the optical functional layer 50 in the transmissive area TA. In an embodiment, as shown in FIG. 2, first to third through holes 10H, 40H, and 50H may be defined through the display panel 10, the input sensing layer 40, and the optical functional layer 50, respectively. The first through hole 10H may be defined through the display panel 10 from the upper surface to the lower surface of the display panel 10, the second through hole 40H may be defined through the input sensing layer 40 from the upper surface to the lower surface of the input sensing layer 40, and the third through hole 50H may be defined through the optical functional layer 50 from the upper surface to the lower surface of the optical functional layer 50.

In an embodiment, at least one selected from the display panel 10, the input sensing layer 40, and the optical functional layer 50 may not include a through hole. In an embodiment, for example, one or two of the display panel 10, the input sensing layer 40, and the optical functional layer 50 may not include a through hole. Alternatively, when a transmittance of the transmissive area TA may be secured, each of the display panel 10, the input sensing layer 40, and the optical functional layer 50 may not include a through hole located in the transmissive area TA.

Figure 3:
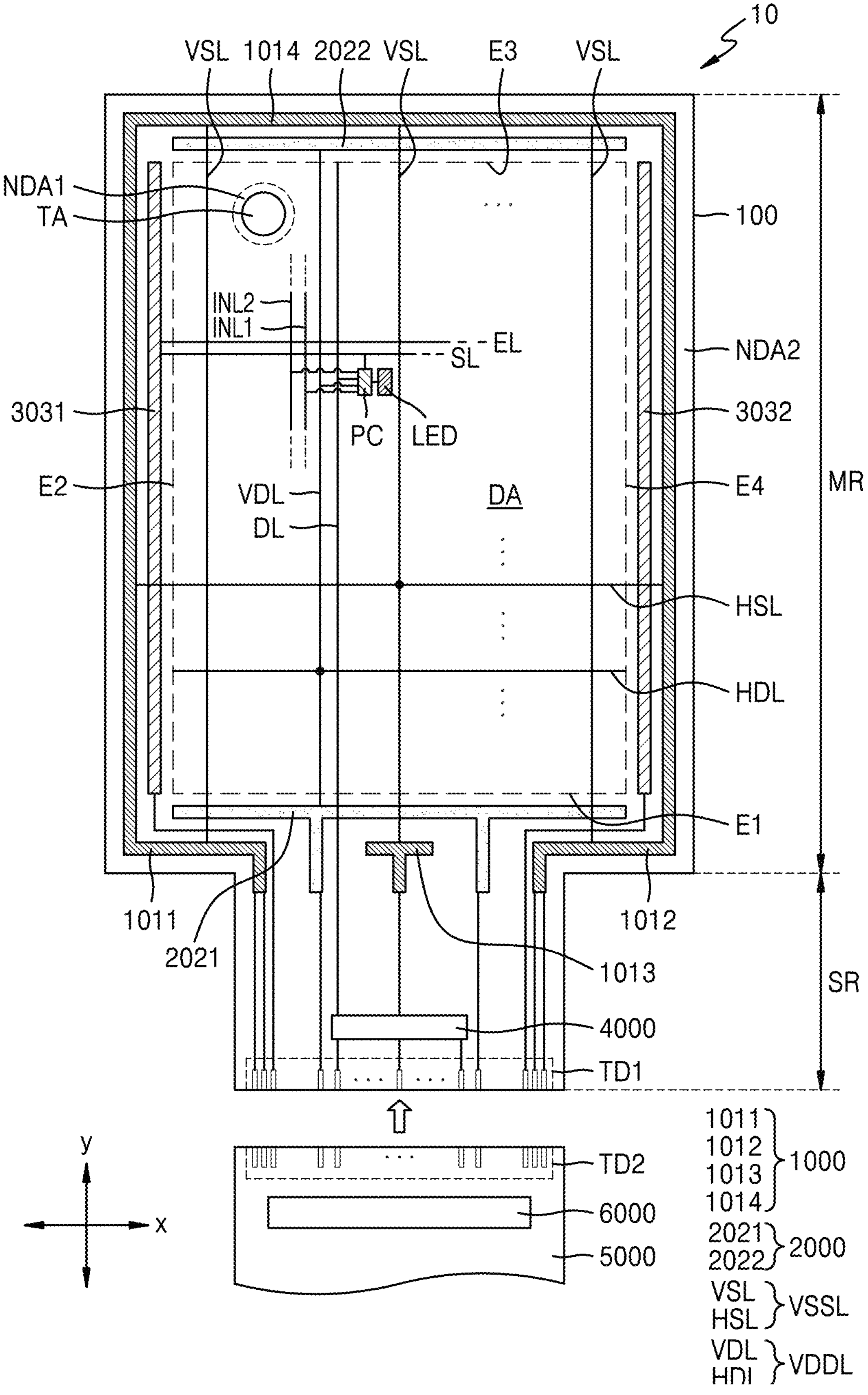
FIG. 3 is a schematic plan view of a display panel according to an embodiment.
Figure 4:
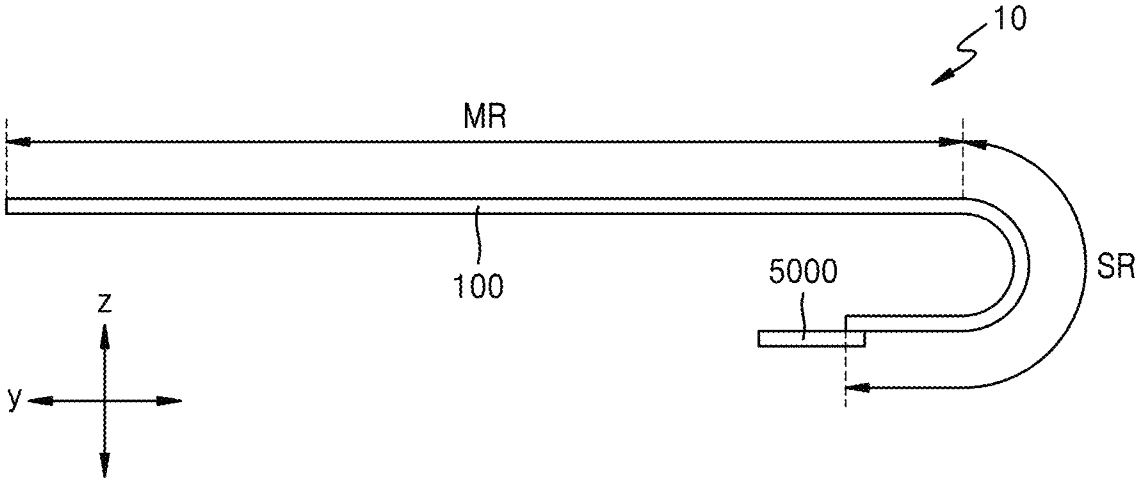
FIG. 4 is a schematic side view of the display panel of FIG. 3.

FIG. 3 is a schematic plan view of the display panel 10 according to an embodiment, and FIG. 4 is a schematic side view of the display panel 10 of FIG. 3.

Referring to FIG. 3, an embodiment of the display panel 10 may include the transmissive area TA, the display area DA, the first non-display area NDA1, and the second non-display area NDA2. The shape of the display panel 10 may be actually the same as that of a substrate 100.

The transmissive area TA may be arranged inside the display area DA and surrounded by the display area DA entirely. In an embodiment, as shown in FIGS. 1A and 3, the transmissive area TA may be arranged on the upper left side of the display area DA. In an alternative embodiment, the transmissive area TA may be arranged on the upper center of the display area DA. Alternatively, the transmissive area TA may be arranged on the upper right side of the display area DA.

The first non-display area NDA1 may be located between the transmissive area TA and the display area DA, and may surround the transmissive area TA entirely. In an embodiment, as described above with reference to FIG. 2, the display panel 10 includes the first through hole 10H (see FIG. 2) located in the transmissive area TA, and a structure for preventing moisture from progressing to the display area DA may be disposed, where the moisture may be introduced through the first through hole 10H. In an embodiment, for example, a layer (e.g., first and second functional layers described below) including an organic material may be continuously formed in the display area DA to cover the display area DA entirely, but discontinuously formed in the first non-display area NDA1. In an alternative embodiment, for example, a layer (e.g., the first and second functional layers described below) including an organic material may include a plurality of portions arranged in the first non-display area NDA1 and separated from each other.

The display area DA is a region configured to display images, and may have various shapes, for example, circular shapes, elliptical shapes, polygons, specific figures, and the like. FIG. 1 shows an embodiment where the display area DA approximately has a quadrangular shape, but not being limited thereto. Alternatively, the display area DA may approximately have a quadrangular shape having round edges in another embodiment.

Light-emitting diodes LED may be arranged in the display area DA. The light-emitting diodes LED may be electrically connected to sub-pixel circuits PC arranged in the display area DA, respectively. The sub-pixel circuit PC may include transistors connected to a signal line or a voltage line for controlling turning on/off, brightness, and the like of the light-emitting diode LED. FIG. 3 shows a scan line SL, an emission control line EL, and a data line DL as signal lines electrically connected to the transistors, and shows a driving voltage line VDDL, a common voltage line VSSL, a first initialization voltage line INL1, and a second initialization voltage line INL2 as voltage lines.

The second non-display area NDA2 may be arranged outside the display area DA. The second non-display area NDA2 may surround the display area DA entirely. A portion (referred to as a protrusion peripheral area, hereinafter) of the second non-display area NDA2 may extend in a direction away from the display area DA. In such an embodiment, the display panel 10 may include a main region MR and a sub region SR extending in one direction from the main region MR, where the main region MR includes the transmissive area TA, the first non-display area NDA1, the display area DA, and a portion of the second non-display area NDA2 surrounding the display area DA. The sub region SR may correspond to the protrusion peripheral area described above. The width (the width in the x direction) of the sub region SR may be less than the width (the width in the x direction) of the main region MR. A portion of the sub region SR may be bent as shown in FIG. 4. In an embodiment where the display panel 10 is bent as shown in FIG. 4, the second non-display area NDA2, which is the non-display area, may not be viewed, or the area that is viewed may be reduced even though the second non-display area NDA2 is viewed when the electronic apparatus 1 (see FIG. 1A) including the display panel 10 is viewed.

The shape of the display panel 10 may be substantially the same as that of the substrate 100. In an embodiment, for example, the substrate 100 may include the transmissive area TA, the first non-display area NDA1, the display area DA, and the second non-display area NDA2. In such an embodiment, the substrate 100 may include the main region MR and the sub region SR.

In an embodiment, as shown in FIG. 3, a common voltage supply line 1000, a driving voltage supply line 2000, first and second driving circuits 3031 and 3032, and a data driving circuit 4000 may be arranged in the second non-display area NDA2.

The common voltage supply line 1000 may include a first common voltage input part 1011 and a second common voltage input part 1012 adjacent to a first edge E1 of the display area DA. In an embodiment, the first common voltage input part 1011 may be apart from the second common voltage input part 1012. The common voltage supply line 1000 may further include a third common voltage input part 1013 located between the first common voltage input part 1011 and the second common voltage input part 1012. The first common voltage input part 1011 and the second common voltage input part 1012 may be respectively arranged on two opposite ends of the first edge E1 of the display area DA. The third common voltage input part 1013 may be arranged on the intermediate portion of the first edge E1 of the display area DA. In an embodiment, a plurality of third common voltage input parts 1013 may be arranged between the first common voltage input part 1011 and the second common voltage input part 1012. Alternatively, the third common voltage input part 1013 may not be arranged between the first common voltage input part 1011 and the second common voltage input part 1012.

The first common voltage input part 1011 may be connected to the second common voltage input part 1012 by a body part 1014 extending along a second edge E2, a third edge E3, and a fourth edge E4 of the display area DA. In such an embodiment, the first common voltage input part 1011, the second common voltage input part 1012, and the body part 1014 may be integrally formed as a single unitary and indivisible body.

The common voltage supply line 1000 may be electrically connected to the common voltage lines VSSL extending across the display area DA. The common voltage lines VSSL arranged in the display area DA may extend to cross each other. In an embodiment, for example, the common voltage lines VSSL may include common voltage lines extending in the y direction and common voltage lines extending in the x direction. Hereinafter, for convenience of description, the ‘common voltage line extending in the y direction’ is referred to as a vertical common voltage line VSL, and the ‘common voltage line extending in the x direction’ is referred to as a horizontal common voltage line HSL.

The vertical common voltage line VSL and the horizontal common voltage line HSL may pass across the display area DA to cross each other. The vertical common voltage line VSL and the horizontal common voltage line HSL may be disposed on different layers, and connected to each other through a contact hole formed in at least one insulating layer disposed therebetween. A contact hole for connection between the vertical common voltage line VSL and the horizontal common voltage line HSL may be located or defined in the display area DA.

The driving voltage supply line 2000 may include first and second driving voltage input parts 2021 and 2022 apart from each other with the display area DA therebetween. The first and second driving voltage input parts 2021 and 2022 may extend substantially in parallel to each other with the display area DA therebetween. The first driving voltage input part 2021 may be adjacent to the first edge E1 of the display area DA, and the second driving voltage input part 2022 may be adjacent to the third edge E3 of the display area DA.

The driving voltage supply line 2000 may be electrically connected to the driving voltage lines VDDL passing across the display area DA. The driving voltage lines VDDL arranged in the display area DA may extend to cross each other. In an embodiment, for example, the driving voltage lines VDDL may include driving voltage lines extending in the y direction and driving voltage lines extending in the x direction. Hereinafter, for convenience of description, the 'driving voltage line extending in the y direction' is referred to as a vertical driving voltage line VDL, and the 'driving voltage line extending in the x direction' is referred to as a horizontal driving voltage line HDL.

The vertical driving voltage line VDL and the horizontal driving voltage line HDL may pass across the display area DA to cross each other. The vertical driving voltage line VDL and the horizontal driving voltage line HDL may be disposed in different layers, from each other and connected to each other through a contact hole defined or formed in at least one insulating layer disposed therebetween. A contact hole for connection between the vertical driving voltage line VDL and the horizontal driving voltage line HDL may be located in the display area DA.

The first and second driving circuits 3031 and 3032 may be arranged in the second non-display area NDA2, and electrically connected to the scan line SL and the emission control line EL. In an embodiment, some of scan lines SL may be electrically connected to the first driving circuit 3031, and the rest of the scan lines SL may be connected to the second driving circuit 3032. The first and second driving circuits 3031 and 3032 may include a scan driver configured to generate scan signals. The generated scan signals may be transferred to one of the transistors of the sub-pixel circuit PC through the scan line SL. The first and second driving circuits 3031 and 3032 may include an emission control driver configured to generate emission control signals. The generated emission control signals may be transferred to one of the transistors of the sub-pixel circuit PC through the emission control line EL.

The data driving circuit 4000 may be configured to transfer a data signal to one of the transistors of the sub-pixel circuit PC through the data line DL extending across the display area DA.

A first terminal part TD1 may be located on one side of the substate 100. A printed circuit board 5000 may be attached to the first terminal part TD1. The printed circuit board 5000 may include a second terminal part TD2 electrically connected to the first terminal part TD1. A controller 6000 may be disposed on the printed circuit board 5000. Control signals of the controller 6000 may be provided to each of the first and second driving circuits 3031 and 3032, the data driving circuit 4000, the driving voltage supply line 2000, and the common voltage supply line 1000 through the first and second terminal parts TD1 and TD2.

Figure 5:
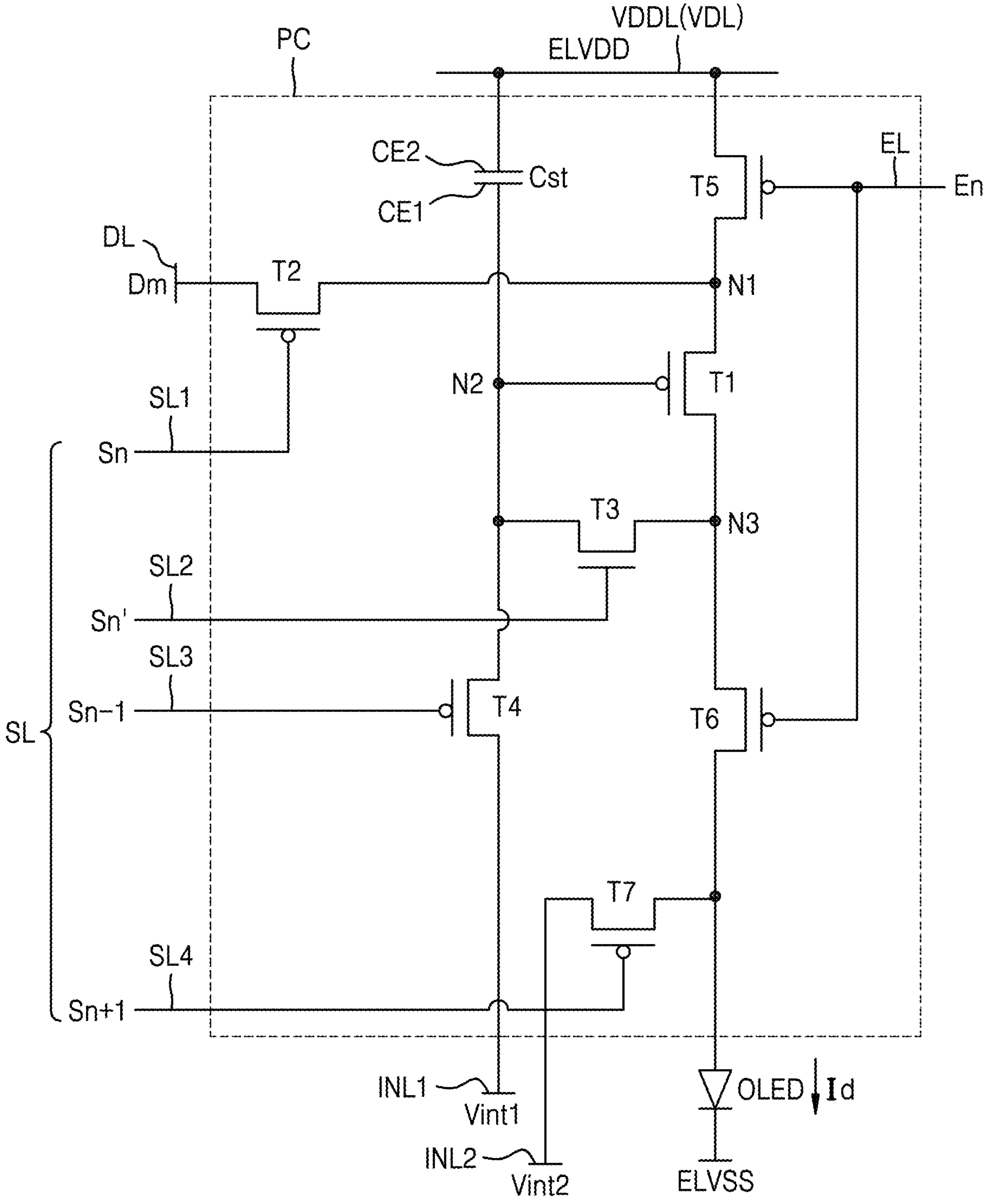
FIG. 5 is a schematic equivalent circuit diagram of a sub-pixel circuit electrically connected to a light-emitting diode disposed on a display panel according to an embodiment.

FIG. 5 is a schematic equivalent circuit diagram of a sub-pixel circuit electrically connected to a light-emitting diode disposed on the display panel according to an embodiment.

In an embodiment, as shown in FIG. 5, the sub-pixel circuit PC may include a plurality of transistors T1, T2, T3, T4, T5, T6, and T7, and a storage capacitor Cst. The sub-pixel circuit PC is electrically connected to the light-emitting diode. Hereinafter, for convenience of description, an embodiment where the light-emitting diode is an organic light-emitting diode OLED will be described.

The plurality of transistors T1, T2, T3, T4, T5, T6, and T7 may include a driving transistor T1, a switching transistor T2, a compensation transistor T3, a first initialization transistor T4, an operation control transistor T5, an emission control transistor T6, and a second initialization transistor T7.

The light-emitting diode, for example, the organic light-emitting diode OLED, may include a first electrode (e.g., an anode) and a second electrode (e.g., a cathode). The first electrode of the organic light-emitting diode OLED may be connected to the driving transistor T1 through the emission control transistor T6 to receive a driving current Id, and the second electrode thereof may receive a common voltage ELVSS. The organic light-emitting diode OLED may emit light of brightness corresponding to the driving current.

The sub-pixel circuit PC may be electrically connected to a plurality of scan lines SL. The scan lines SL may include a first scan line SL1, a second scan line SL2, a third scan line SL3, and a fourth scan line SL4, where the first scan line SL1 is configured to transfer a first scan signal Sn, the second scan line SL2 is configured to transfer a second scan signal Sn', the third scan line SL3 is a previous scan line configured to transfer a previous scan signal Sn−1 to the first initialization transistor T4, and the fourth scan line SL4 is a next scan line configured to transfer a next scan signal Sn+1 to the second initialization transistor T7.

The sub-pixel circuit PC may be electrically connected to the emission control line EL and the data line DL, where the emission control line EL is configured to transfer an emission control signal En to the operation control transistor T5 and the emission control transistor T6, and the data line DL is configured to transfer a data signal Dm.

The driving voltage line VDDL, for example, the vertical driving voltage line VDL, may be configured to transfer the driving voltage ELVDD to the driving transistor T1, the first initialization voltage line INL1 may be configured to transfer a first initialization voltage Vint1 that initializes the driving transistor T1, and the second initialization voltage line INL2 may be configured to transfer a second initialization voltage Vint2 that initializes the first electrode of the organic light-emitting diode OLED.

A driving gate electrode of the driving transistor T1 may be connected to the storage capacitor Cst through a second node N2, one of a source region and a drain region of the driving transistor T1 may be connected to a driving voltage line PL through the operation control transistor T5 via a first node N1, and the other of the source region and the drain region of the driving transistor T1 may be connected to the first electrode (e.g., the anode) of the organic light-emitting diode OLED through the emission control transistor T6 via a third node N3. The driving transistor T1 may be configured to receive a data signal Dm and supply the driving current to the organic light-emitting diode OLED according to a switching operation of the switching transistor T2. That is, the driving transistor T1 may be configured to control the amount of current flowing from the first node N1 to the organic light-emitting diode OLED in response to a voltage applied to the second node N2 and changed by a data signal Dm, such that the first node N1 is electrically connected to the driving voltage line PL.

A switching gate electrode of the switching transistor T2 may be connected to the first scan line SL1 configured to transfer a first scan signal Sn, one of a source region and a drain region of the switching transistor T2 may be connected to the data line DL, and the other of the source region and the drain region of the switching transistor T2 may be connected to the driving transistor T1 through the first node N1 and connected to the driving voltage line PL through the operation control transistor T5. The switching transistor T2 may be configured to transfer a data signal Dm from the data line DL to the first node N1 in response to a voltage applied to the first scan line SL1. That is, the switching transistor T2 may perform a switching operation by being turned on in response to a first scan signal Sn transferred through the first scan line SL1 and transferring a data signal Dm to the driving transistor T1 through the first node N1, such that the data signal Dm is transferred through the data line DL.

A compensation gate electrode of the compensation transistor T3 is connected to the second scan line SL2. One of a source region and a drain region of the compensation transistor T3 may be connected to the first electrode of the organic light-emitting diode OLED through the emission control transistor T6 via the third node N3. The other of the source region and the drain region of the compensation transistor T3 may be connected to a first capacitor electrode CE1 of the storage capacitor Cst and the driving gate electrode of the driving transistor T1 through the second node N2. The compensation transistor T3 may diode-connect the driving transistor T1 by being turned on in response to a second scan signal Sn' received through the second scan line SL2.

A first initialization gate electrode of the first initialization transistor T4 may be connected to the third scan line SL3. One of a source region and a drain region of the first initialization transistor T4 may be connected to the first initialization voltage line INL1. One of the source region and the drain region of the first initialization transistor T4 may be connected to the first capacitor electrode CE1 of the storage capacitor Cst and the driving gate electrode of the driving transistor T1 through the second node N2. The first initialization transistor T4 may be configured to apply the first initialization voltage Vint1 from the first initialization voltage line INL1 to the second node N2 in response to a voltage applied to the third scan line SL3. That is, the first initialization transistor T4 may be turned on in response to a previous scan signal Sn−1 received through the third scan line SL3 and may perform an initialization operation of initializing the voltage of the driving gate voltage of the driving transistor T1 by transferring the first initialization voltage Vint1 to the driving gate electrode of the driving transistor T1.

An operation control gate electrode of the operation control transistor T5 may be connected to the emission control line EL, one of a source region and a drain region of the operation control transistor T5 may be connected to the driving voltage line PL, and the other of the source region and the drain region of the operation control transistor T5 may be connected to the driving transistor T1 and the switching transistor T2 through the first node N1.

An emission control gate electrode of the emission control transistor T6 may be connected to the emission control line EL, one of a source region and a drain region of the emission control transistor T6 may be connected to the driving transistor T1 and the compensation transistor T3 through the third node N3, and the other of the source region and the drain region of the emission control transistor T6 may be electrically connected to the first electrode (e.g., the anode) of the organic light-emitting diode OLED.

The operation control transistor T5 and the emission control transistor T6 may be simultaneously turned on according to an emission control signal En transferred through the emission control line EL, the driving voltage ELVDD is transferred to the organic light-emitting diode OLED, and the driving current flows through the organic light-emitting diode OLED.

A second initialization gate electrode of the second initialization transistor T7 may be connected to the fourth scan line SL4, one of a source region and a drain region of the second initialization transistor T7 may be connected to the first electrode (e.g., the anode) of the organic light-emitting diode OLED, and the other of the source region and the drain region of the second initialization transistor T7 may be electrically connected to the second initialization voltage line INL2 to receive the second initialization voltage Vint2. The second initialization transistor T7 is turned on in response to a next scan signal Sn+1 transferred through the fourth scan line SL4 and initializes the first electrode (e.g., the anode) of the organic light-emitting diode OLED. In an embodiment, the fourth scan line SL4 may be the same as the first scan line SL1. In such an embodiment, the relevant scan line may be configured to transfer the same electric signals with a time difference, and thus, may serve as the first scan line SL1 and the next scan line arranged on a next row. That is, the fourth scan line SL4 may be adjacent to the sub-pixel circuit PC shown in FIG. 5 and be the first scan line of another sub-pixel circuit electrically connected to a same data line DL.

The storage capacitor Cst may include the first capacitor electrode CE1 and a second capacitor electrode CE2. The first capacitor electrode CE1 of the storage capacitor Cst is connected to the driving gate electrode of the driving transistor T1 through the second node N2, and the second capacitor electrode CE2 of the storage capacitor Cst is connected to the driving voltage line PL. The storage capacitor Cst may store charge corresponding to a difference between a voltage of the driving gate electrode of the driving transistor T1 and the driving voltage ELVDD.

In an embodiment, the plurality of transistors T1, T2, T3, T4, T5, T6, and T7 may be p-channel metal oxide semiconductor field-effect transistors (MOSFETs). Some of the plurality of transistors T1, T2, T3, T4, T5, T6, and T7 may be n-channel metal oxide semiconductor field-effect transistors (n-channel MOSFETs), and the rest may be p-channel metal oxide semiconductor field-effect transistors (p-channel MOSFETs). In an embodiment, for example, among the plurality of thin-film transistors T1, T2, T3, T4, T5, T6, and T7, the compensation transistor T3 and the first initialization transistor T4 may be n-channel MOSFET (NMOS), and the rest may be p-channel MOSFET (PMOS). Alternatively, the compensation transistor T3 among the plurality of thin-film transistors T1, T2, T3, T4, T5, T6, and T7 may be an NMOS, and the rest may be PMOS. Alternatively, the compensation transistor T3 and the first initialization transistor T4 may be NMOS, and the rest may be PMOS. Alternatively, all of the plurality of thin-film transistors T1, T2, T3, T4, T5, T6, and T7 may be NMOS. The plurality of transistors T1, T2, T3, T4, T5, T6, and T7 may each include amorphous silicon or polycrystalline silicon. Alternatively, a transistor, which is an NMOS, may include an oxide semiconductor.

In an embodiment, in the case where the compensation transistor T3 and the first initialization transistor T4 among the plurality of thin-film transistors T1, T2, T3, T4, T5, T6, and T7 are NMOS, and the rest are PMOS, the first to fourth scan lines SL1, SL2, SL3, and SL4 may be arranged separately, and the first initialization voltage line INL1 and the second initialization voltage line INL2 may be arranged separately. In an alternative embodiment, where the plurality of thin-film transistors T1, T2, T3, T4, T5, T6, and T7 are the same type of transistors (e.g., PMOS), the first scan line SL1 and the second scan line SL2 of FIG. 5 may be the same line, and/or the first initialization voltage line INL1 and the second initialization voltage line INL2 may be the same line. In an embodiment where the first scan line SL1 and the second scan line SL2 are the same line as each other, the first scan line SL1 and the second scan line SL2 may be defined by portions of a same scan line configured to transfer a same signal simultaneously in the circuit diagram of FIG. 5. In an embodiment, where the first initialization voltage line INL1 and the second initialization voltage line INL2 are the same line as each other, the first initialization voltage line INL1 and the second initialization voltage line INL2 may be defined by portions of a same initialization voltage line configured to provide a same voltage simultaneously in the circuit diagram of FIG. 5.

Figure 6:
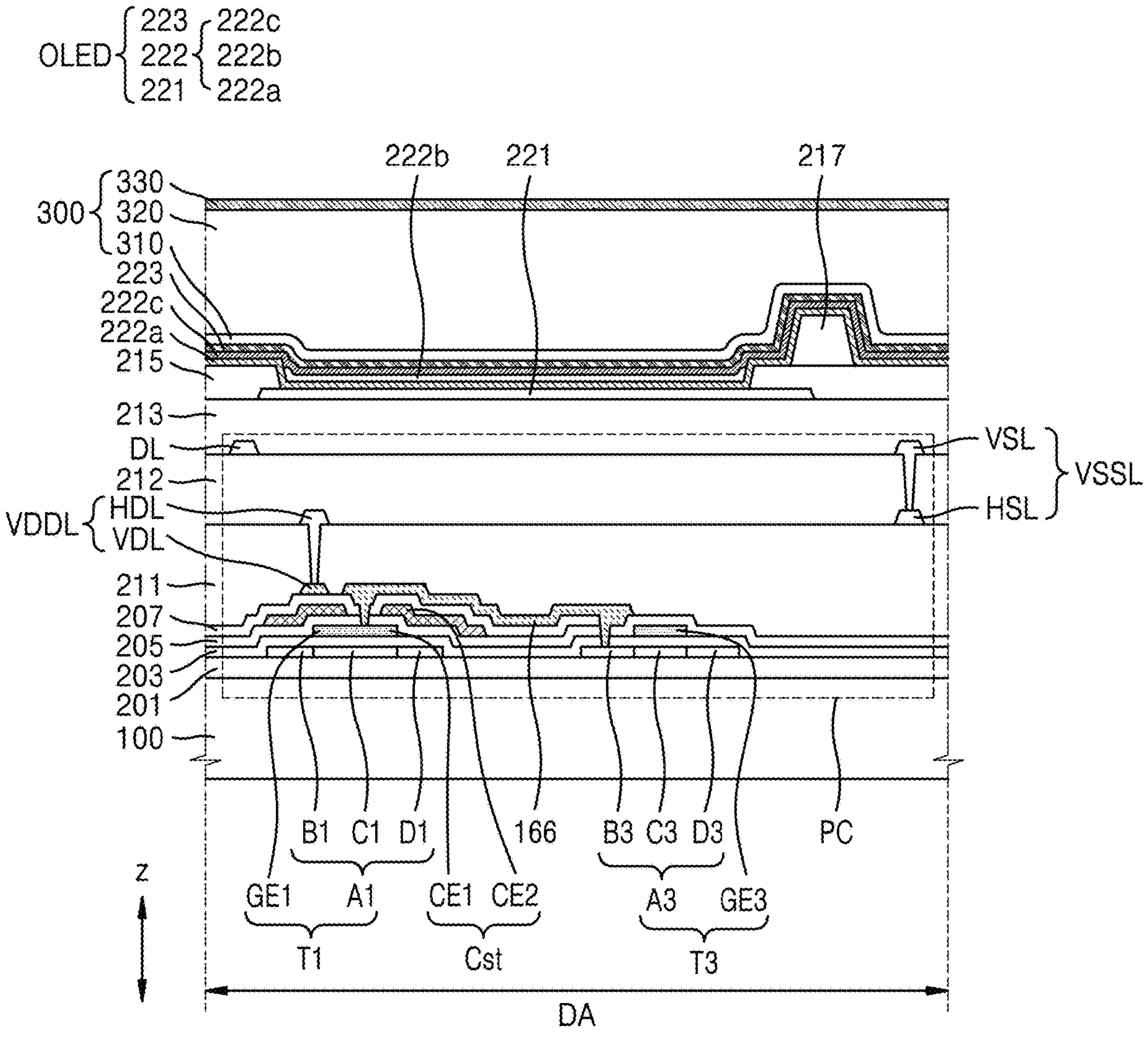
FIG. 6 is a schematic cross-sectional view of a display area of a display panel according to an embodiment.

FIG. 6 is a schematic cross-sectional view of a display area of the display panel according to an embodiment.

Referring to FIG. 6, in an embodiment, the organic light-emitting diode OLED may be arranged in the display area DA, and the organic light-emitting diode OLED may be electrically connected to the sub-pixel circuit PC disposed between the substrate 100 and the organic light-emitting diode OLED in a direction perpendicular to the substrate 100 (e.g., a z direction or a thickness direction of the display panel).

The substrate 100 may include glass or a polymer resin. In an embodiment, the substrate 100 may have a stack structure in which a base layer and a barrier layer are alternately stacked one on another, where the base layer includes a polymer resin, and the barrier layer including an inorganic insulating material such as silicon oxide or silicon nitride. The polymer resin may include at least one selected from polyethersulfone, polyarylate, polyetherimide, polyethylene naphthalate, polyethylene terephthalate, polyphenylene sulfide, polyimide, polycarbonate, cellulose tri acetate, cellulose acetate propionate, and the like.

A buffer layer 201 may be formed on the substrate 100 before the sub-pixel circuit PC is formed to prevent impurities from penetrating to the sub-pixel circuit PC. The buffer layer 201 may include an inorganic insulating material, such as silicon nitride, silicon oxynitride, and silicon oxide, and have a single-layered structure or a multi-layered structure, each layer therein including at least one selected from the above inorganic insulating materials.

The sub-pixel circuit PC may include the plurality of transistors and the storage capacitor as described above with reference to FIG. 5. FIG. 6 shows the driving transistor T1, the compensation transistor T3, and the storage capacitor Cst.

The driving transistor T1 may include a semiconductor layer A1 (referred to as a driving semiconductor layer, hereinafter) on the buffer layer 201, and a driving gate electrode GE1 overlapping a channel region C1 of the driving semiconductor layer A1. The driving semiconductor layer A1 may include a silicon-based semiconductor material, for example, polycrystalline silicon. The driving semiconductor layer A1 may include the channel region C1, a first region B1, and a second region D1 respectively arranged on two opposite sides of the channel region C1. The first region B1 and the second region D1 are regions including impurities of higher concentration than that of the channel region C1. One of the first region B1 and the second region D1 may correspond to a source region, and the other of the first region B1 and the second region D1 may correspond to a drain region.

The compensation transistor T3 may include a semiconductor layer A3 (referred to as a compensation semiconductor layer, hereinafter) on the buffer layer 201, and a compensation gate electrode GE3 overlapping a channel region C3 of the compensation semiconductor layer A3. The compensation semiconductor layer A3 may include the channel region C3, a first region B3, and a second region D3 respectively arranged on two opposite sides of the channel region C3. The first region B3 and the second region D3 are regions including impurities of higher concentration than that of the channel region C3. One of the first region B3 and the second region D3 may correspond to a source region, and the other of the first region B3 and the second region D3 may correspond to a drain region.

The driving gate electrode GE1 and the compensation gate electrode GE3 may include a conductive material including at least one selected from molybdenum (Mo), aluminum (Al), copper (Cu), and titanium (Ti) and have a single-layered structure or a multi-layered structure, each layer therein including at least one selected from the above materials.

A gate insulating layer 203 may be disposed between the driving semiconductor layer A1 and the driving gate electrode GE1, and between the compensation semiconductor layer A3 and the compensation gate electrode GE3. The gate insulating layer 203 may include an inorganic insulating material, such as silicon nitride, silicon oxynitride, and silicon oxide, and include a single-layered structure or a multi-layered structure, each layer therein including at least one selected from the above inorganic insulating materials.

The storage capacitor Cst may include the first capacitor electrode CE1 and a second capacitor electrode CE2 overlapping each other. In an embodiment, the first capacitor electrode CE1 of the storage capacitor Cst may include the driving gate electrode GE1. In such an embodiment, the driving gate electrode GE1 may include the first capacitor electrode CE1 of the storage capacitor Cst. In an embodiment, for example, the driving gate electrode GE1 and the first capacitor electrode CE1 of the storage capacitor Cst may be integrally formed as a single unitary and indivisible body.

A first interlayer insulating layer 205 may be disposed between the first capacitor electrode CE1 and the second capacitor electrode CE2 of the storage capacitor Cst. The first interlayer insulating layer 205 may include an inorganic insulating material, such as silicon nitride, silicon oxynitride, and silicon oxide, and have a single-layered structure or a multi-layered structure, each layer therein including at least one selected from the above inorganic insulating materials.

The second capacitor electrode CE2 of the storage capacitor Cst may include a conductive material of a low-resistance material, such as molybdenum (Mo), aluminum (Al), copper (Cu) and/or titanium (Ti), and have a single-layered structure or a multi-layered structure, each layer therein including at least one selected from the above materials.

A second interlayer insulating layer 207 may be disposed on the storage capacitor Cst. The second interlayer insulating layer 207 may include an inorganic insulating material, such as silicon nitride, silicon oxynitride, and silicon oxide, and have a single-layered structure or a multi-layered structure, each layer therein including at least one selected from the above inorganic insulating materials.

The driving transistor T1 may be electrically connected to the compensation transistor T3 through a node connection line 166. The node connection line 166 may be disposed on the second interlayer insulating layer 207. One side of the node connection line 166 may be connected to the driving gate electrode GE1 of the driving transistor T1, and another side of the node connection line 166 may be connected to the compensation semiconductor layer A3 of the compensation transistor T3.

The node connection line 166 may include aluminum (Al), copper (Cu), and/or titanium (Ti), and have a single layer or a multi-layer, each layer therein including at least one selected from the above materials. In an embodiment, for example, the node connection line 166 may have a triple-layered structure of titanium layer/aluminum layer/titanium layer.

A first organic insulating layer 211 may be disposed on the node connection line 166. The first organic insulating layer 211 may include an organic insulating material. The organic insulating material may include acryl, benzocyclobutene (BCB), polyimide, or hexamethyldisiloxane (HMDSO).

The driving voltage line VDDL may include the vertical driving voltage line VDL and the horizontal driving voltage line HDL disposed in different layers from each other. The first organic insulating layer 211 may be disposed between the vertical driving voltage line VDL and the horizontal driving voltage line HDL. In an embodiment, for example, the vertical driving voltage line VDL may be disposed under the first organic insulating layer 211, and the horizontal driving voltage line HDL may be disposed on the first organic insulating layer 211. A portion of the horizontal driving voltage line HDL may be connected to a portion of the vertical driving voltage line VDL through a contact hole defined in the first organic insulating layer 211.

In an embodiment where the driving voltage line VDDL includes the vertical driving voltage line VDL and the horizonal driving voltage line HDL, a voltage drop due to the resistance of the driving voltage line VDDL itself may be effectively prevented.

Each of the vertical driving voltage line VDL and the horizonal driving voltage line HDL may include aluminum (Al), copper (Cu), and/or titanium (Ti), and have a single layer or a multi-layer, each layer therein including at least one selected from the above materials. In an embodiment, for example, the vertical driving voltage line VDL and the horizonal driving voltage line HDL may have a triple-layered structure of titanium layer/aluminum layer/titanium layer.

The common voltage line VSSL may include the vertical common voltage line VSL and the horizontal common voltage line HSL disposed in different layers from each other. A second organic insulating layer 212 may be disposed between the vertical common voltage line VSL and the horizontal common voltage line HSL. In an embodiment, for example, the vertical common voltage line VSL may be disposed on the second organic insulating layer 212, and the horizontal common voltage line HSL may be disposed under the second organic insulating layer 212. A portion of the vertical common voltage line VSL may be connected to a portion of the horizontal common voltage line HSL through a contact hole defined in the second organic insulating layer 212.

Each of the vertical common voltage line VSL and the horizonal common voltage line HSL may include aluminum (Al), copper (Cu), and/or titanium (Ti), and have a single layer or a multi-layer, each layer therein including at least one selected from the above materials. In an embodiment, for example, the vertical common voltage line VSL and the horizonal common voltage line HSL may have a triple-layered structure of titanium layer/aluminum layer/titanium layer.

The data line DL may be disposed on the second organic insulating layer 212. The data line DL may include aluminum (Al), copper (Cu), and/or titanium (Ti), and have a single layer or a multi-layer, each layer therein including at least one selected from the above materials. In an embodiment, for example, the data line DL may have a triple-layered structure of titanium layer/aluminum layer/titanium layer.

A third organic insulating layer 213 may be disposed on the data line DL. The third organic insulating layer 213 may include acryl, BCB, polyimide, and/or HMDSO.

A light-emitting diode, for example, the organic light-emitting diode OLED, may be disposed on the third organic insulating layer 213. A first electrode 221 of the organic light-emitting diode OLED may include a reflective layer including silver (Ag), magnesium (Mg), aluminum (Al), platinum (Pt), palladium (Pd), gold (Au), nickel (Ni), neodymium (Nd), iridium (Ir), chrome (Cr), or a compound thereof. In an alternative embodiment, the first electrode 221 may further include a conductive oxide material layer on and/or under the reflective layer. The conductive oxide material layer may include indium tin oxide (ITO), indium zinc oxide (IZO), zinc oxide (ZnO), indium oxide ($In_2O_3$), indium gallium oxide (IGO), and/or aluminum zinc oxide (AZO). In an embodiment, the first electrode 221 may have a triple-layered structure of ITO layer/Ag layer/ITO layer.

A bank layer 215 may be disposed on the first electrode 221. The bank layer 215 may include an opening that overlaps the first electrode 221 and cover the edges of the first electrode 221, that is, an opening may be defined through the bank layer 215 to overlap the first electrode 221 and the bank layer 215 may cover the edges of the first electrode 221. The bank layer 215 may include an organic insulating material.

An intermediate layer 222 includes an emission layer **222*b*. The intermediate layer 222 may include a first functional layer 222*a* and/or a second functional layer 222*c*, where the first functional layer 222*a* is under the emission layer 222*b*, and the second functional layer 222*c* is on the emission layer 222*b*. The emission layer 222*b* may include a polymer organic material or a low-molecular weight organic material emitting light having a preset color. The second functional layer 222*c* may include an electron transport layer (ETL) and/or an electron injection layer (EIL). The first functional layer 222*a* and the second functional layer 222*c*** may each include an organic material.

The second electrode 223 may include a conductive material having a low work function. In an embodiment, for example, the second electrode 223 may include a (semi) transparent layer including silver (Ag), magnesium (Mg), aluminum (Al), platinum (Pt), palladium (Pd), gold (Au), nickel (Ni), neodymium (Nd), iridium (Ir), chrome (Cr), or an alloy thereof. Alternatively, the second electrode 223 may further include a layer on the (semi) transparent layer, the layer including ITO, IZO, ZnO, or $In_2O_3$.

The emission layer **222*b* may be disposed or formed in the display area DA to overlap the first electrode 221 through the opening of the bank layer 215. In an embodiment, the first functional layer 222*a*, the second functional layer 222*c*, and the second electrode 223** may cover the display area DA entirely.

A spacer 217 may be disposed or formed on the bank layer 215. The spacer 217 may be formed together with the bank layer 215 during a same process as a process of forming the bank layer 215, or formed separately during a separate process. In an embodiment, the spacer 217 may include an organic insulating material, such as polyimide.

The organic light-emitting diode OLED may be covered by an encapsulation layer 300. The encapsulation layer 300 may include at least one organic encapsulation layer and at least one inorganic encapsulation layer. In an embodiment, as shown in FIG. 6, the encapsulation layer 300 includes first and second inorganic encapsulation layers 310 and 330, and an organic encapsulation layer 320 therebetween.

The first and second inorganic encapsulation layer 310 and 330 may include at least one inorganic material selected from aluminum oxide, titanium oxide, tantalum oxide, hafnium oxide, zinc oxide, silicon oxide, silicon nitride, silicon oxynitride, and the like. The first and second inorganic encapsulation layer 310 and 330 may have a single layer or a multi-layer, each layer therein including at least one selected from the above materials. The organic encapsulation layer 320 may include a polymer-based material. The polymer-based material may include an acryl-based resin, an epoxy-based resin, polyimide, or polyethylene. In an embodiment, the organic encapsulation layer 320 may include acrylate.

Figure 7:
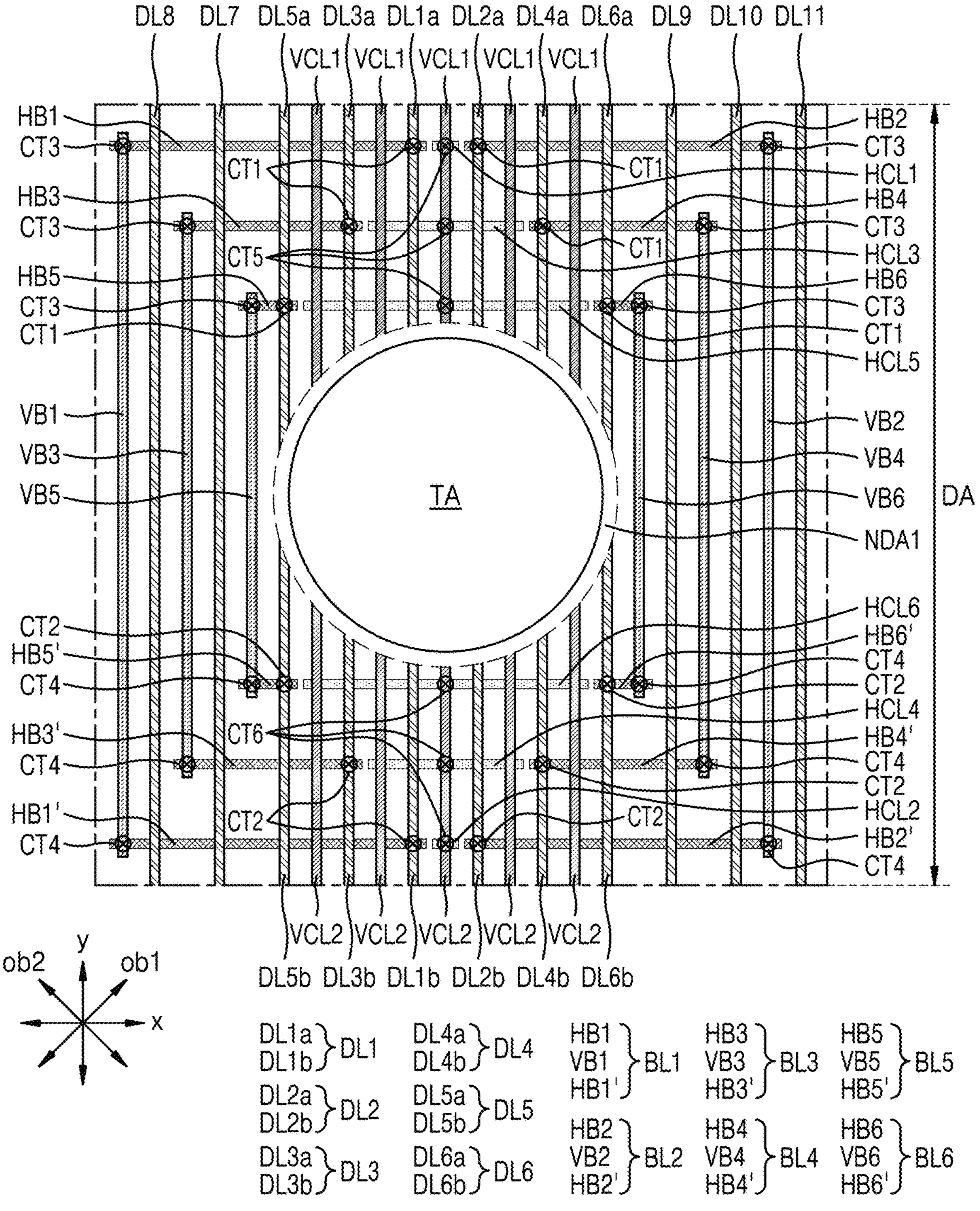
FIG. 7 is a schematic plan view of a portion of a transmissive area of a display panel and a display area adjacent to the transmissive area according to an embodiment.

FIG. 7 is a schematic plan view of a portion of the transmissive area TA of the display panel and the display area DA adjacent to the transmissive area TA according to an embodiment.

Referring to FIG. 7, in an embodiment, data lines extend in the first direction (e.g., the y direction), and some of the data lines may include portions apart from each other with the transmissive area TA therebetween. In an embodiment, as shown in FIG. 7, first to sixth data lines DL1, DL2, DL3, DL4, DL5, and DL6 each extend in the first direction (e.g., the y direction) and respectively include first parts DL1*a*, DL2*a*, DL3*a*, DL4*a*, DL5*a*, and DL6*a* and second parts DL1*b*, DL2*b*, DL3*b*, DL4*b*, DL5*b*, and DL6*b*. Referring to FIG. 7, seventh to eleventh data lines DL7, DL8, DL9, DL10, and DL11 may each be apart from the transmissive area TA in the second direction (the x direction) and may extend in the first direction (e.g., the y direction).

A first part and a second part of a data line apart from each other with the transmissive area TA therebetween may be electrically connected to each other through a bridge line located in the display area DA. In an embodiment, for example, the first part DL1*a* of the first data line DL1 may be electrically connected to the second part DL1*b* of the first data line DL1 through a first bridge line BL1.

The first bridge line BL1 may include a first vertical bridge part VB1 and a pair of first horizontal bridge parts HB1 and HB1', where the first vertical bridge part VB1 extends in the first direction (e.g., the y direction), and the pair of first horizontal bridge parts HB1 and HB1' are respectively disposed on two opposite sides of the first vertical bridge part VB1 and extend in the second direction (e.g., the x direction). The first vertical bridge part VB1 may be disposed in a layer different from a layer in which the pair of first horizontal bridge parts HB1 and HB1' are disposed. The first vertical bridge part VB1 may be disposed on an insulating layer, and the pair of first horizontal bridge parts HB1 and HB1' may be disposed under the insulating layer. In an embodiment, for example, the first vertical bridge part VB1 may be disposed on the second organic insulating layer 212 described with reference to FIG. 6, and the pair of first horizontal bridge parts HB1 and HB1' may be disposed under the second organic insulating layer 212.

A first end of the first horizontal bridge part HB1 may cross the first part DL1*a* of the first data line DL1 and be electrically connected to the first part DL1*a* of the first data line DL1 through a first contact hole CT1, and a second end of the first horizontal bridge part HB1 may cross the first vertical bridge part VB1 and be electrically connected to the first vertical bridge part VB1 through a third contact hole CT3. The first contact hole CT1 may be defined in a portion of an insulating layer (e.g., the second organic insulating layer) disposed between the first end of the first horizontal bridge part HB1 and the first part DL1*a* of the first data line DL1, and the third contact hole CT3 may be defined in a portion of an insulating layer (e.g., the second organic insulating layer) disposed between the second end of the first horizontal bridge part HB1 and the first vertical bridge part VB1.

A first end of the first horizontal bridge part HB1' may cross the second part DL1*b* of the first data line DL1 and be electrically connected to the second part DL1*b* of the first data line DL1 through a second contact hole CT2, and a second end of the first horizontal bridge part HB1' may cross the first vertical bridge part VB1 and be electrically connected to the first vertical bridge part VB1 through a fourth contact hole CT4. The second contact hole CT2 may be defined in a portion of an insulating layer (e.g., the second organic insulating layer) disposed between the first end of the first horizontal bridge part HB1' and the second part DL1*b* of the first data line DL1, and the fourth contact hole CT4 may be defined in a portion of an insulating layer (e.g., the second organic insulating layer) disposed between the second end of the first horizontal bridge part HB1' and the first vertical bridge part VB1.

The first contact hole CT1 and the second contact hole CT2, which are connection points of the pair of first horizontal bridge parts HB1 and HB1' and the first and second parts DL1*a* and DL1*b* of the first data line DL1, and the third contact hole CT3 and the fourth contact hole CT4, which are connection points of the pair of first horizontal bridge parts HB1 and HB1' and the first vertical bridge part VB1, may be located in the display area DA.

In a comparative example, where the connection points of the first and second parts DL1*a* and DL1*b* of the first data line DL1, and the first bridge line BL1 are located in the first non-display area NDA1, the first non-display area NDA1 may increase to maintain a minimum interval between the connection points. In an embodiment of the invention, the connection points between the first bridge line BL1 and the first data line DL1 are located in the display area DA, such that the area of the first non-display area NDA1 may be reduced.

The first part DL2*a* of the second data line DL2 may be electrically connected to the second part DL2*b* of the second data line DL2 through a second bridge line BL2.

The second bridge line BL2 may include a second vertical bridge part VB2 and a pair of second horizontal bridge parts HB2 and HB2', where the second vertical bridge part VB2 extends in the first direction (e.g., the y direction), and the pair of second horizontal bridge parts HB2 and HB2' are respectively disposed on two opposite sides of the second vertical bridge part VB2 and extend in the second direction (e.g., the x direction). The second vertical bridge part VB2 may be disposed in a layer different from a layer in which the pair of second horizontal bridge parts HB2 and HB2' are disposed.

A first end of the second horizontal bridge part HB2 may cross the second part DL2*a* of the second data line DL2 and be electrically connected to the second part DL2*a* of the second data line DL2 through the first contact hole CT1, and a second end of the second horizontal bridge part HB2 may cross the second vertical bridge part VB2 and be electrically connected to the second vertical bridge part VB2 through the third contact hole CT3.

A first end of the second horizontal bridge part HB2' may cross the second part DL2*b* of the second data line DL2 and be electrically connected to the second part DL2*b* of the second data line DL2 through the second contact hole CT2, and a second end of the second horizontal bridge part HB2' may cross the second vertical bridge part VB2 and be electrically connected to the second vertical bridge part VB2 through the fourth contact hole CT4.

The first contact hole CT1 and the second contact hole CT2, which are connection points of the pair of second horizontal bridge parts HB2 and HB2' and the first and second parts DL2*a* and DL2*b* of the second data line DL2, and the third contact hole CT3 and the fourth contact hole CT4, which are connection points of the pair of second horizontal bridge parts HB2 and HB2' and the second vertical bridge part VB2, may be located in the display area DA. In such an embodiment, the area of the first non-display area NDA1 may be reduced.

The first bridge line BL1 and the second bridge line BL2 electrically connected to the first data line DL1 and the second data line DL2 adjacent to each other, respectively, may be located opposite to each other with the transmissive area TA therebetween. In an embodiment, for example, the first bridge line BL1 may be disposed on one side (e.g., the left side in FIG. 7) of the transmissive area TA, and the second bridge line BL2 may be disposed on another side (e.g., the right side in FIG. 7) of the transmissive area TA.

A horizontal conductive line may be arranged between the end of the first bridge line BL1 and the end of the second bridge line BL2. A first horizontal conductive line HCL1 may be arranged between a first end of the first horizontal bridge part HB1 corresponding to the first end of the first bridge line BL1, and a first end of the second horizontal bridge part HB2 corresponding to the first end of the second bridge line BL2. The first horizontal conductive line HCL1 may be located between the first horizontal bridge part HB1 and the second horizontal bridge part HB2 while apart from the first horizontal bridge part HB1 and the second horizontal bridge part HB2.

A second horizontal conductive line HCL2 may be arranged between the first end of the first horizontal bridge part HB1' corresponding to the second end of the first bridge line BL1, and the first end of the second horizontal bridge part HB2' corresponding to the second end of the second bridge line BL2. The second horizontal conductive line HCL2 may be located between the first horizontal bridge part HB1' and the second horizontal bridge part HB2' while apart from the first horizontal bridge part HB1' and the second horizontal bridge part HB2'.

The first part DL3*a* of the third data line DL3 may be electrically connected to the second part DL3*b* of the third data line DL3 through a third bridge line BL3.

The third bridge line BL3 may include a third vertical bridge part VB3 and a pair of third horizontal bridge parts HB3 and HB3', where the third vertical bridge part VB3 extends in the first direction (e.g., the y direction), and the pair of third horizontal bridge parts HB3 and HB3' are respectively disposed on two opposite sides of the third vertical bridge part VB3 and extend in the second direction (e.g., the x direction). The third vertical bridge part VB3 may be disposed in a layer different from a layer in which the pair of third horizontal bridge parts HB3 and HB3' are disposed.

A first end of the third horizontal bridge part HB3 may cross the first part DL3*a* of the third data line DL3 and be electrically connected to the first part DL3*a* of the third data line DL3 through the first contact hole CT1, and a second end of the third horizontal bridge part HB3 may cross the third vertical bridge part VB3 and be electrically connected to the third vertical bridge part VB3 through the third contact hole CT3.

A first end of the third horizontal bridge part HB3' may cross the second part DL3*b* of the third data line DL3 and be electrically connected to the second part DL3*b* of the third data line DL3 through the second contact hole CT2, and a second end of the third horizontal bridge part HB3' may cross the third vertical bridge part VB3 and be electrically connected to the third vertical bridge part VB3 through the fourth contact hole CT4.

The first contact hole CT1 and the second contact hole CT2, which are connection points of the pair of third horizontal bridge parts HB3 and HB3' and the first and second parts DL3*a* and DL3*b* of the third data line DL3, and the third contact hole CT3 and the fourth contact hole CT4, which are connection points of the pair of third horizontal bridge parts HB3 and HB3' and the third vertical bridge part VB3, may be located in the display area DA.

The first part DL4*a* of the fourth data line DL4 may be electrically connected to the second part DL4*b* of the fourth data line DL4 through a fourth bridge line BL4.

The fourth bridge line BL4 may include a fourth vertical bridge part VB4 and a pair of fourth horizontal bridge parts HB4 and HB4', where the fourth vertical bridge part VB4 extends in the first direction (e.g., the y direction), and the pair of fourth horizontal bridge parts HB4 and HB4' are respectively disposed on two opposite sides of the fourth vertical bridge part VB4 and extend in the second direction (e.g., the x direction). The fourth vertical bridge part VB4 may be disposed in a layer different from a layer in which the pair of fourth horizontal bridge parts HB4 and HB4' are disposed.

A first end of the fourth horizontal bridge part HB4 may cross the first part DL4*a* of the fourth data line DL4 and be electrically connected to the first part DL4*a* of the fourth data line DL4 through the first contact hole CT1. A second end of the fourth horizontal bridge part HB4 may cross the fourth vertical bridge part VB4 and be electrically connected to the fourth vertical bridge part VB4 through the third contact hole CT3.

A first end of the fourth horizontal bridge part HB4' may cross the second part DL4*b* of the fourth data line DL4 and be electrically connected to the second part DL4*b* of the fourth data line DL4 through the second contact hole CT2. A second end of the fourth horizontal bridge part HB4' may cross the fourth vertical bridge part VB4 and be electrically connected to the fourth vertical bridge part VB4 through the fourth contact hole CT4.

The first contact hole CT1 and the second contact hole CT2, which are connection points of the pair of fourth horizontal bridge parts HB4 and HB4' and the first and second parts DL4*a* and DL4*b* of the fourth data line DL4, and the third contact hole CT3 and the fourth contact hole CT4, which are connection points of the pair of fourth horizontal bridge parts HB4 and HB4' and the fourth vertical bridge part VB4, may be located in the display area DA.

The third bridge line BL3 and the fourth bridge line BL4 respectively connected to the third data line DL3 and the fourth data line DL4 may be located opposite each other with the transmissive area TA therebetween. In an embodiment, for example, the third bridge line BL3 may be disposed on one side (e.g., the left side in FIG. 7) of the transmissive area TA, and the fourth bridge line BL4 may be disposed on another side (e.g., the right side in FIG. 7) of the transmissive area TA.

A horizontal conductive line may be arranged between the end of the third bridge line BL3 and the end of the fourth bridge line BL4. A third horizontal conductive line HCL3 may be arranged between a first end of the third horizontal bridge part HB3 corresponding to the first end of the third bridge line BL3, and a first end of the fourth horizontal bridge part HB4 corresponding to the first end of the fourth bridge line BL4. The third horizontal conductive line HCL3 may be located between the third horizontal bridge part HB3 and the fourth horizontal bridge part HB4 while apart from the third horizontal bridge part HB3 and the fourth horizontal bridge part HB4.

A fourth horizontal conductive line HCL4 may be arranged between the first end of the third horizontal bridge part HB3' corresponding to the second end of the third bridge line BL3, and the first end of the fourth horizontal bridge part HB4' corresponding to the second end of the fourth bridge line BL4. The fourth horizontal conductive line HCL4 may be located between the third horizontal bridge part HB3' and the fourth horizontal bridge part HB4' while apart from the third horizontal bridge part HB3' and the fourth horizontal bridge part HB4'.

The first part DL5*a* of the fifth data line DL5 may be electrically connected to the second part DL5*b* of the fifth data line DL5 through a fifth bridge line BL5.

The fifth bridge line BL5 may include a fifth vertical bridge part VB5 and a pair of fifth horizontal bridge parts HB5 and HB5', where the fifth vertical bridge part VB5 extends in the first direction (e.g., the y direction), and the pair of fifth horizontal bridge parts HB5 and HB5' are respectively disposed on two opposite sides of the fifth vertical bridge part VB5 and extend in the second direction (e.g., the x direction). The fifth vertical bridge part VB5 may be disposed in a layer different from a layer in which the pair of fifth horizontal bridge parts HB5 and HB5' are disposed.

A first end of the fifth horizontal bridge part HB5 may cross the first part DL5*a* of the fifth data line DL5 and be electrically connected to the first part DL5*a* of the fifth data line DL5 through the first contact hole CT1, and a second end of the fifth horizontal bridge part HB5 may cross the fifth vertical bridge part VB5 and be electrically connected to the fifth vertical bridge part VB5 through the third contact hole CT3.

A first end of the fifth horizontal bridge part HB5' may cross the second part DL5*b* of the fifth data line DL5 and be electrically connected to the second part DL5*b* of the fifth data line DL5 through the second contact hole CT2, and a second end of the fifth horizontal bridge part HB5' may cross the fifth vertical bridge part VB5 and be electrically connected to the fifth vertical bridge part VB5 through the fourth contact hole CT4.

The first contact hole CT1 and the second contact hole CT2, which are connection points of the pair of fifth horizontal bridge parts HB5 and HB5' and the first and second parts DL5*a* and DL5*b* of the fifth data line DL5, and the third contact hole CT3 and the fourth contact hole CT4, which are connection points of the pair of fifth horizontal bridge parts HB5 and HB5' and the fifth vertical bridge part VB5, may be located in the display area DA.

The first part DL6*a* of the sixth data line DL6 may be electrically connected to the second part DL6*b* of the sixth data line DL6 through a sixth bridge line BL6.

The sixth bridge line BL6 may include a sixth vertical bridge part VB6 and a pair of sixth horizontal bridge parts HB6 and HB6', where the sixth vertical bridge part VB6 extends in the first direction (e.g., the y direction), and the pair of sixth horizontal bridge parts HB6 and HB6' are respectively disposed on two opposite sides of the sixth vertical bridge part VB6 and extend in the second direction (e.g., the x direction). The sixth vertical bridge part VB6 may be disposed in a layer different from a layer in which the pair of sixth horizontal bridge parts HB6 and HB6' are disposed.

A first end of the sixth horizontal bridge part HB6 may cross the first part DL6*a* of the sixth data line DL6 and be electrically connected to the first part DL6*a* of the sixth data line DL6 through the first contact hole CT1, and a second end of the sixth horizontal bridge part HB6 may cross the sixth vertical bridge part VB6 and be electrically connected to the sixth vertical bridge part VB6 through the third contact hole CT3.

A first end of the sixth horizontal bridge part HB6' may cross the second part DL6*b* of the sixth data line DL6 and be electrically connected to the second part DL6*b* of the sixth data line DL6 through the second contact hole CT2, and a second end of the sixth horizontal bridge part HB6' may cross the sixth vertical bridge part VB6 and be electrically connected to the sixth vertical bridge part VB4 through the fourth contact hole CT4.

The first contact hole CT1 and the second contact hole CT2, which are connection points of the pair of sixth horizontal bridge parts HB6 and HB6' and the first and second parts DL6*a* and DL6*b* of the sixth data line DL6, and the third contact hole CT3 and the fourth contact hole CT4, which are connection points of the pair of sixth horizontal bridge parts HB6 and HB6' and the sixth vertical bridge part VB6, may be located in the display area DA.

The fifth bridge line BL5 and the sixth bridge line BL6 respectively connected to the fifth data line DL5 and the sixth data line DL6 may be located opposite each other with the transmissive area TA therebetween. In an embodiment, for example, the fifth bridge line BL5 may be disposed on one side (e.g., the left side in FIG. 7) of the transmissive area TA, and the sixth bridge line BL6 may be disposed on another side (e.g., the right side in FIG. 7) of the transmissive area TA.

A horizontal conductive line may be arranged between the end of the fifth bridge line BL5 and the end of the sixth bridge line BL6. In an embodiment, for example, a fifth horizontal conductive line HCL5 may be arranged between a first end of the fifth horizontal bridge part HB5 corresponding to the first end of the fifth bridge line BL5, and a first end of the sixth horizontal bridge part HB6 corresponding to the first end of the sixth bridge line BL6. The fifth horizontal conductive line HCL5 may be located between the fifth horizontal bridge part HB5 and the sixth horizontal bridge part HB6 while apart from the fifth horizontal bridge part HB5 and the sixth horizontal bridge part HB6.

A sixth horizontal conductive line HCL6 may be arranged between the first end of the fifth horizontal bridge part HB5' corresponding to the second end of the fifth bridge line BL5, and the first end of the sixth horizontal bridge part HB6' corresponding to the second end of the sixth bridge line BL6. The sixth horizontal conductive line HCL6 may be located between the fifth horizontal bridge part HB5' and the sixth horizontal bridge part HB6' while apart from the fifth horizontal bridge part HB5' and the sixth horizontal bridge part HB6'.

In an embodiment, the first horizontal conductive line HCL1 and the second horizontal conductive line HCL2 may be located opposite each other with the transmissive area TA therebetween. In such an embodiment, the third horizontal conductive line HCL3 and the fourth horizontal conductive line HCL4 may be located opposite each other with the transmissive area TA therebetween, and the fifth horizontal conductive line HCL5 and the sixth horizontal conductive line HCL6 may be located opposite each other with the transmissive area TA therebetween.

Horizontal conductive lines arranged on the same side with respect to the transmissive area TA may have different lengths from each other. In an embodiment, for example, the first, third, and fifth horizontal conductive lines HCL1, HCL3, and HCL5 arranged on the upper side of the transmissive area TA may have different lengths from each other, and the second, fourth, and sixth horizontal conductive lines HCL2, HCL4, and HCL6 arranged on the lower side of the transmissive area TA may have different lengths from each other.

In an embodiment, for example, the length of the horizontal conductive line may decrease or increase as the horizontal conductive line is away in the first direction (e.g., the y direction) from the transmissive area TA. In an embodiment, as shown in FIG. 7, the fifth horizontal conductive line HCL5 may be longer than the third horizontal conductive line HCL3, and the third horizontal conductive line HCL3 may be longer than the first horizontal conductive line HCL1. In such an embodiment, the sixth horizontal conductive line HCL6 may be longer than the fourth horizontal conductive line HCL4, and the fourth horizontal conductive line HCL4 may be longer than the second horizontal conductive line HCL2. In such an embodiment, the length of the horizontal conductive line may be reduced as the horizontal conductive line is away from the transmissive area TA. In an alternative embodiment, where each of the fifth horizontal bridge part HB5 and the sixth horizontal bridge part HB6 is longer than the third horizontal bridge part HB3 and the fourth horizontal bridge part HB4, and each of the first horizontal bridge part HB1 and the second horizontal bridge part HB2 is shorter than the third horizontal bridge part HB3 and the fourth horizontal bridge part HB4, lengths of the horizontal conductive lines may increase in the order of the fifth horizontal conductive line HCL5, the third horizontal conductive line HCL3, and the first horizontal conductive line HCL1. In such an embodiment, the length of the horizontal conductive line may increase as the horizontal conductive line is away from the transmissive area TA.

In an embodiment, the left ends of the first, third, and fifth horizontal conductive lines HCL1, HCL3, and HCL5 arranged on the upper side of the transmissive area TA may be located on an imaginary line in a first diagonal direction ob1, and the right ends may be located on an imaginary line in the second diagonal direction ob2. In such an embodiment, the left ends of the second, fourth, and sixth horizontal conductive lines HCL2, HCL4, and HCL6 arranged on the lower side of the transmissive area TA may be located on an imaginary line in the second diagonal direction ob2, and the right ends may be located on an imaginary line in the first diagonal direction ob1. Here, the first diagonal direction ob1 denotes an oblique direction forming an acute angle with respect to the first direction (the y direction) and the second direction (the x direction), and the second diagonal direction ob2 denotes an oblique direction which is oblique with respect to the first direction (the y direction) and the second direction (the x direction), and crossing the first diagonal direction ob1.

The first to sixth horizontal conductive lines HCL1, HCL2, HCL3, HCL4, HCL5, and HCL6 may be electrically connected to the conductive line (e.g., the first vertical conductive line VCL1 and the second vertical conductive line VCL2), and may have a preset voltage level. In a comparative example, where the first to sixth horizontal conductive lines HCL1, HCL2, HCL3, HCL4, HCL5, and HCL6 are electrically floated, external static electricity may be introduced around the transmissive area TA to damage the display panel. In an embodiment of the invention, because the first to sixth horizontal conductive lines HCL1, HCL2, HCL3, HCL4, HCL5, and HCL6 have a preset voltage, an issue (or undesired effects) due to the static electricity may be effectively prevented.

The first to sixth horizontal conductive lines HCL1, HCL2, HCL3, HCL4, HCL5, and HCL6 may be electrically connected to a vertical conductive line arranged around the transmissive area TA. In an embodiment, for example, as shown in FIG. 7, at least one first vertical conductive line VCL1 may be arranged on the upper side of the transmissive area TA, and at least one second vertical conductive line VCL2 may be arranged on the lower side of the transmissive area TA, where the at least one first vertical conductive line VCL1 extends in the first direction (the y direction), and the at least one second vertical conductive line VCL2 extends in the first direction (the y direction).

In an embodiment, the first, third, and fifth horizontal conductive lines HCL1, HCL3, and HCL5 may be electrically connected to the at least one first vertical conductive line VCL1 on the upper side of the transmissive area TA. In such an embodiment, the second, fourth, and sixth horizontal conductive lines HCL2, HCL4, and HCL6 may be electrically connected to the at least one second vertical conductive line VCL2 on the lower side of the transmissive area TA.

In an embodiment, as shown in FIG. 7, one of the first vertical conductive lines VCL1 arranged on the upper side of the transmissive area TA is electrically connected to the first, third, and fifth horizontal conductive lines HCL1, HCL3, and HCL5. In such an embodiment, connection points (e.g., fifth contact holes CT5) between the first, third, and fifth horizontal conductive lines HCL1, HCL3, and HCL5 and the first vertical conductive line VCL1 may be regularly arranged. In an embodiment, for example, connection points (e.g., the fifth contact holes CT5) between the first, third, and fifth horizontal conductive lines HCL1, HCL3, and HCL5 and the first vertical conductive line VCL1 may be arranged in a lengthwise direction (e.g., the y direction) of the first vertical conductive line VCL1. However, the embodiment is not limited thereto. Alternatively, the first, third, and fifth horizontal conductive lines HCL1, HCL3, and HCL5 may be electrically connected to different first vertical conductive lines VCL1, and the connection points (e.g. the fifth contact holes CT5) between the first, third, and fifth horizontal conductive lines HCL1, HCL3, and HCL5 and the first vertical conductive lines VCL1 may be arranged in the display area DA irregularly or at random, and the connection points may be prevented from being viewed to the outside.

In an embodiment, as shown in FIG. 7, one of the second vertical conductive line VCL2 arranged on the lower side of the transmissive area TA is connected to the second, fourth, and sixth horizontal conductive lines HCL2, HCL4, and HCL6. Connection points (e.g., sixth contact holes CT6) between the second, fourth, and sixth horizontal conductive lines HCL2, HCL4, and HCL6 and the second vertical conductive line VCL2 may be regularly arranged. In an embodiment, for example, connection points (e.g., the sixth contact holes CT6) between the second, fourth, and sixth horizontal conductive lines HCL2, HCL4, and HCL6 and the second vertical conductive line VCL2 may be arranged in a lengthwise direction of the second vertical conductive line VCL2. However, the embodiment is not limited thereto. The second, fourth, and sixth horizontal conductive lines HCL2, HCL4, and HCL6 may be electrically connected to different second vertical conductive lines VCL2, and the connection points (e.g. the sixth contact holes CT6) between the second, fourth, and sixth horizontal conductive lines HCL2, HCL4, and HCL6 and the second vertical conductive lines VCL2 may be arranged in the display area DA irregularly (or at random), and thus, the connection points may be prevented from being viewed to the outside.

The conductive lines, for example, e.g., the first vertical conductive line VCL1 and the second vertical conductive line VCL2 to which the first to sixth horizontal conductive lines HCL1, HCL2, HCL3, HCL4, HCL5, and HCL6 are electrically connected, may have a voltage level of a constant voltage. The first vertical conductive line VCL1 and the second vertical conductive line VCL2 may have different voltage levels from or a same voltage level as each other.

The first vertical conductive line VCL1 and/or the second vertical conductive line VCL2 may be electrically connected to the voltage lines described above with reference to FIG. 3 or 5, for example, the driving voltage line VDDL, the common voltage line VSSL, the first initialization voltage line INL1, and/or the second initialization voltage line INL2 and may have a same voltage level as each other.

The data lines (e.g., the first to eleventh data lines) of FIG. 7, the first vertical conductive lines VCL1, and the second vertical conductive lines VCL2 may be disposed in (or directly on) a same layer as each other. In an embodiment, the data lines (e.g., the first to eleventh data lines), the first vertical conductive lines VCL1, and the second vertical conductive lines VCL2 may be disposed on the second organic insulating layer 212 (see FIG. 6), which is the insulating layer described above with reference to FIG. 6. In such an embodiment, the vertical bridge parts of the bridge lines, for example, the first to sixth vertical bridge parts VB1, VB2, VB3, VB4, VB5, and VB6 may be disposed on the second organic insulating layer 212 (see FIG. 6).

The horizontal conductive lines and the bridge lines of FIG. 7 may be disposed on the same layer. In an embodiment, for example, the first to sixth horizontal conductive lines HCL1, HCL2, HCL3, HCL4, HCL5, and HCL6, and the first to sixth horizontal bridge parts HB1, HB1', HB2, HB2', HB3, HB3', HB4, HB4', HB5, HB5', HB6, and HB6' may be disposed on the first organic insulating layer 211 (see FIG. 6), which is the insulating layer described above with reference to FIG. 6.

In an embodiment, as shown in FIG. 7, the third and fourth contact holes CT3 and CT4 arranged on the left side of an imaginary line passing through the center of the transmissive area TA and extending in the y direction, and the third and fourth contact holes CT3 and CT4 arranged on the right side of the virtual line may be symmetrical with respect to the virtual line, but the is not limited thereto. In an embodiment, for example, as shown in FIG. 7, that the third and fourth contact holes CT3 and CT4 are arranged on the left side of the fifth data line DL5, the seventh data line DL7, and the eighth data line DL8, and the third and fourth contact holes CT3 and CT4 are arranged on the right side of the sixth data line DL6, the ninth data line DL9, and the tenth data line DL10, but the embodiment is not limited thereto.

In an alternative embodiment, the third and fourth contact holes CT3 and CT4 may be arranged on the left side of the fifth data line DL5, the seventh data line DL7, and the eighth data line DL8, and the third and fourth contact holes CT3 and CT4 may be arranged on the left side of the sixth data line DL6, the ninth data line DL9, and the tenth data line DL10. In another alternative embodiment, the third and fourth contact holes CT3 and CT4 may be arranged on the right side of the fifth data line DL5, the seventh data line DL7, and the eighth data line DL8, and the third and fourth contact holes CT3 and CT4 may be arranged on the right side of the sixth data line DL6, the ninth data line DL9, and the tenth data line DL10.

Figure 8:
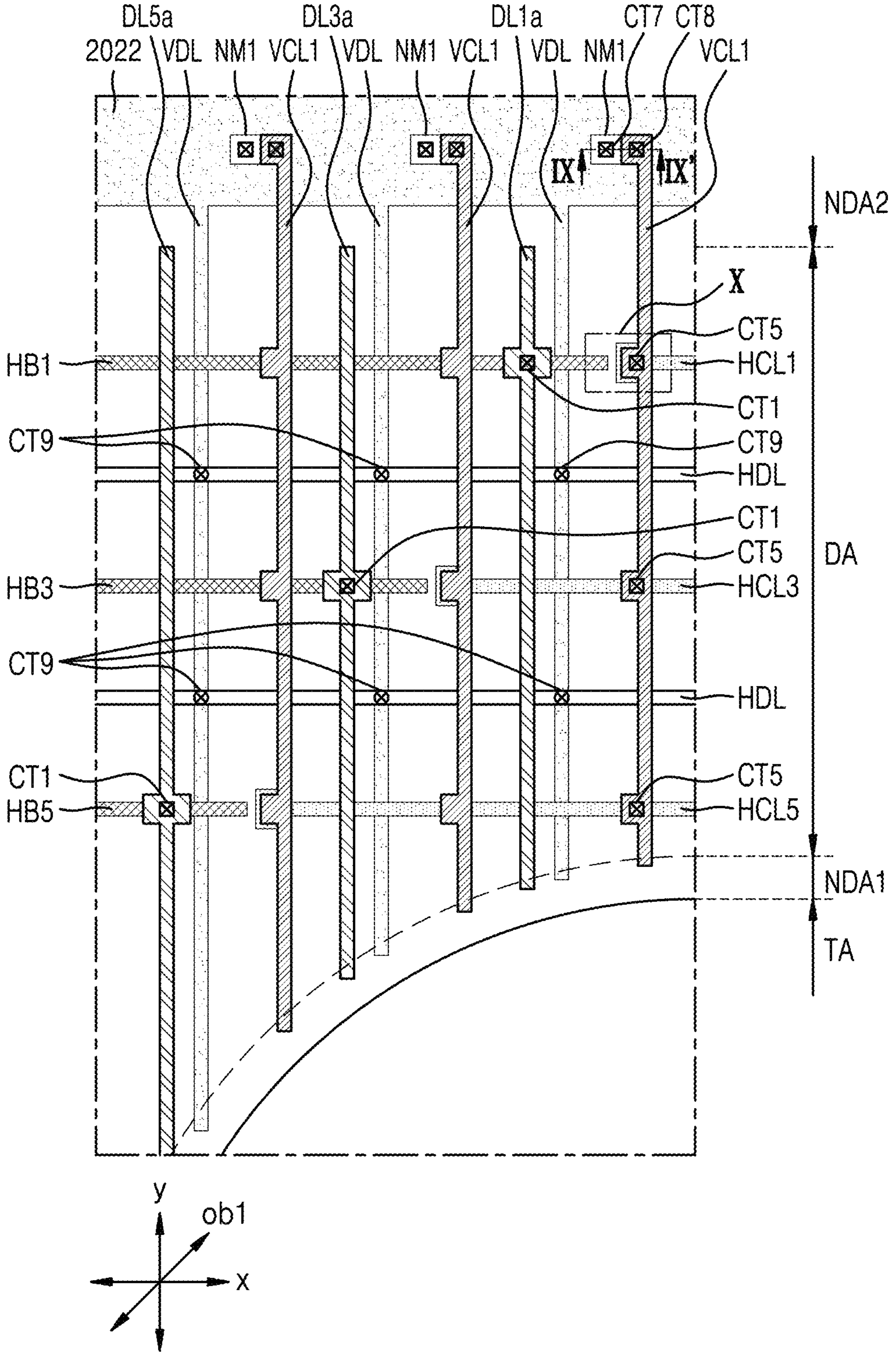
FIG. 8 is an enlarged plan view of a portion of a display panel according to an embodiment, showing a portion of the upper side of the transmissive area of FIG. 7.
Figure 9:
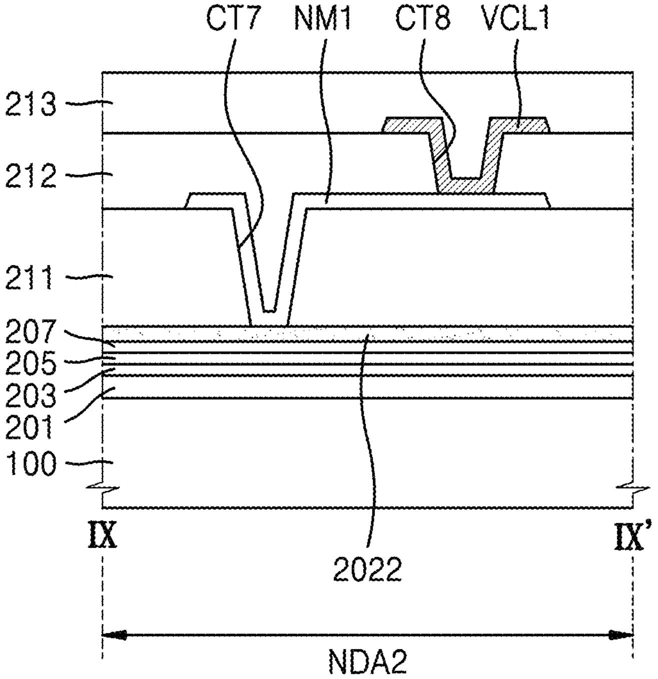
FIG. 9 is a cross-sectional view of the display panel, taken along line IX-IX' of FIG. 8.
Figure 10:
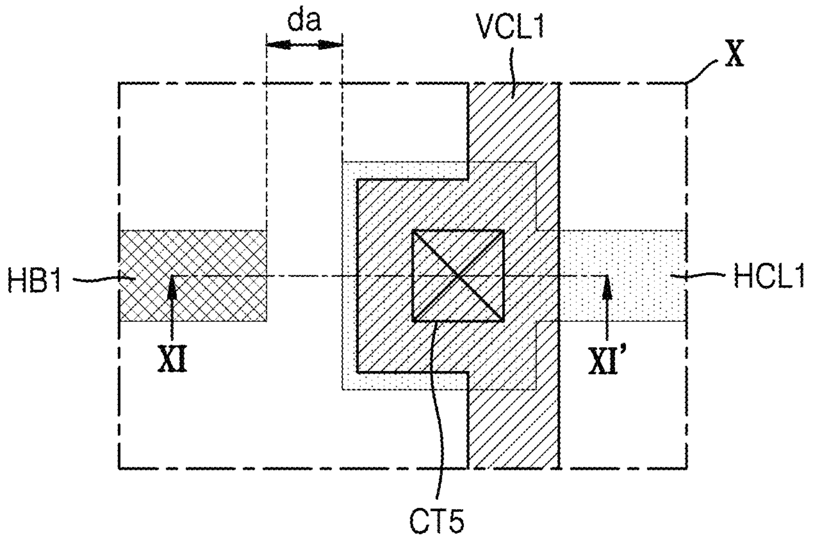
FIG. 10 is an enlarged plan view of a region X of FIG. 8.
Figure 11:
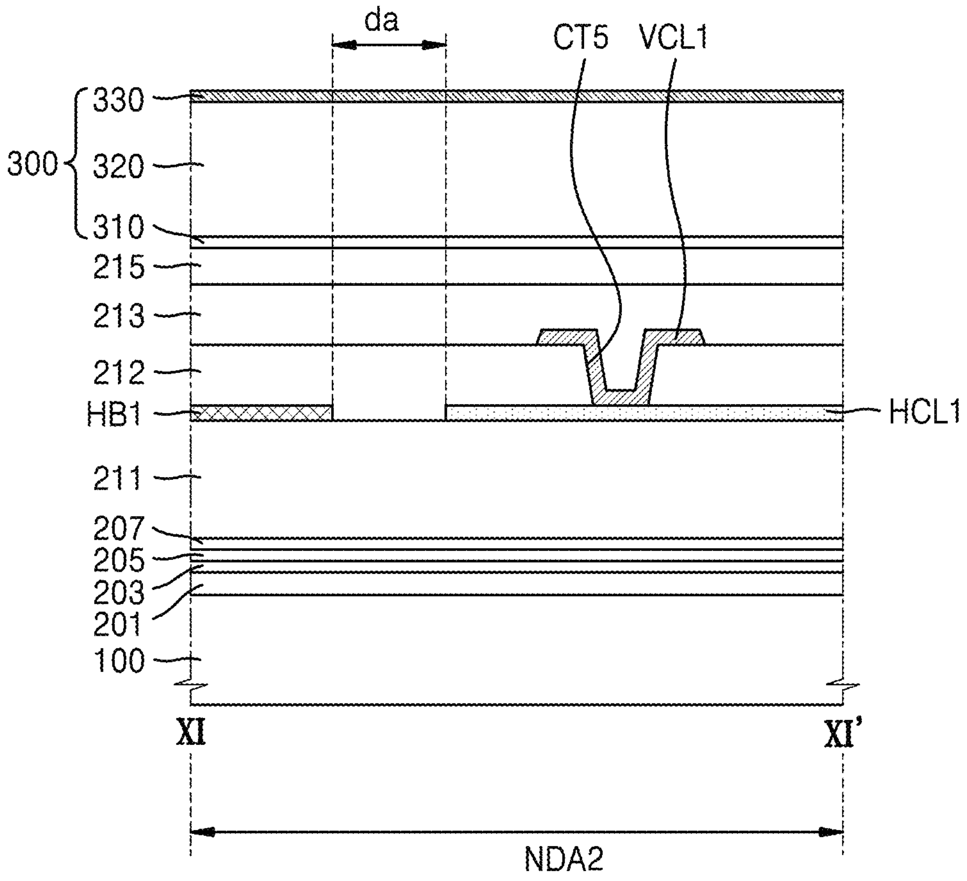
FIG. 11 is a cross-sectional view of the display panel, taken along line XI-XI' of FIG. 10.

FIG. 8 is an enlarged plan view of a portion of a display panel according to an embodiment, showing a portion of the upper side of the transmissive area of FIG. 7. FIG. 9 is a cross-sectional view of the display panel, taken along line IX-IX' of FIG. 8. FIG. 10 is an enlarged plan view of a region X of FIG. 8. FIG. 11 is a cross-sectional view of the display panel, taken along line XI-XI' of FIG. 10.

Referring to FIG. 8, in an embodiment, the second driving voltage input part 2022 may be located in the second non-display area NDA2 arranged outside the display area DA, and the vertical driving voltage line VDL passing across the display area DA and extending in the first direction (e.g., the y direction) may be electrically and physically connected to the second driving voltage input part 2022. In an embodiment, for example, the vertical driving voltage line VDL of the display area DA may be integrally formed as a single unitary and indivisible body with the second driving voltage input part 2022.

The vertical driving voltage line VDL may be electrically connected to the horizontal driving voltage line HDL passing across the display area DA and extending in the second direction (e.g., the x direction). The horizontal driving voltage lines HDL and the vertical driving voltage lines VDL crossing each other in the display area DA may be disposed in different layers from each other, and electrically connected to each other through a ninth contact hole CT9 located in an intersection point.

Referring to an embodiment of FIG. 8, the first vertical conductive lines VCL1 may have a same voltage level as that of the vertical driving voltage line VDL, the horizontal driving voltage line HDL, and the second driving voltage input part 2022. In an embodiment, as shown in FIG. 8, each of the first vertical conductive lines VCL1 may extend to the second non-display area NDA2, and be electrically connected to the second driving voltage input part 2022 through a contact metal NM1.

In an embodiment, as shown in FIG. 9, the second driving voltage input part 2022 may be arranged on the stack structure of the insulating layers on the substrate 100, for example, the buffer layer 201, the gate insulating layer 203, the first interlayer insulating layer 205, and the second interlayer insulating layer 207.

The contact metal NM1 may overlap the second driving voltage input part 2022 and be disposed on the first organic insulating layer 211. The first organic insulating layer 211 may be disposed on the second driving voltage input part 2022. The contact metal NM1 may be connected to the second driving voltage input part 2022 through a seventh contact hole CT7 defined in the first organic insulating layer 211. The first vertical conductive line VCL1 may overlap the contact metal NM1 and be disposed on the second organic insulating layer 212 on the contact metal NM1. The first vertical conductive line VCL1 may be connected to the contact metal NM1 through an eighth contact hole CT8 defined in the second organic insulating layer 212.

The first vertical conductive line VCL1 electrically connected to the second driving voltage input part 2022 through the contact metal NM1 may have a same voltage level as the second driving voltage input part 2022 and/or the vertical driving voltage VDL.

In an embodiment, as described above with reference to FIG. 7, the horizontal conductive lines arranged on the upper side of the transmissive area TA, for example, the first horizontal conductive line HCL1, the third horizontal conductive line HCL3, and the fifth horizontal conductive lie HCL5 shown in FIG. 8, may be electrically connected to the at least one first vertical conductive line VCL1 through the fifth contact hole CT5.

The horizontal conductive line and the horizontal bridge part of the bridge line arranged in a same row may be apart from each other. In an embodiment, for example, as shown in FIGS. 8 and 10, the first horizontal bridge part HB1 may be apart from the first horizontal conductive line HCL1 by a first distance da. In an embodiment, as shown in FIG. 11, the first horizontal bridge part HB1 and the first horizontal conductive line HCL1 may be arranged on the same layer (e.g., the first organic insulating layer 211) and apart from each other by the first distance da. The first vertical conductive layer VCL1 may be disposed on the second organic insulating layer 212 on the first organic insulating layer 211, and electrically connected to the first horizontal conductive line HCL1 through the fifth contact hole CT5 of the second organic insulating layer 212. Although FIGS. 10 and 11 show only the structures of the first horizontal bridge part HB1, the first horizontal conductive line HCL1, and the first vertical conductive line VCL1 in an embodiment, other horizontal bridge part, horizontal conductive line, and vertical conductive line have a same structure as that described with reference to FIGS. 10 and 11.

Figure 12:
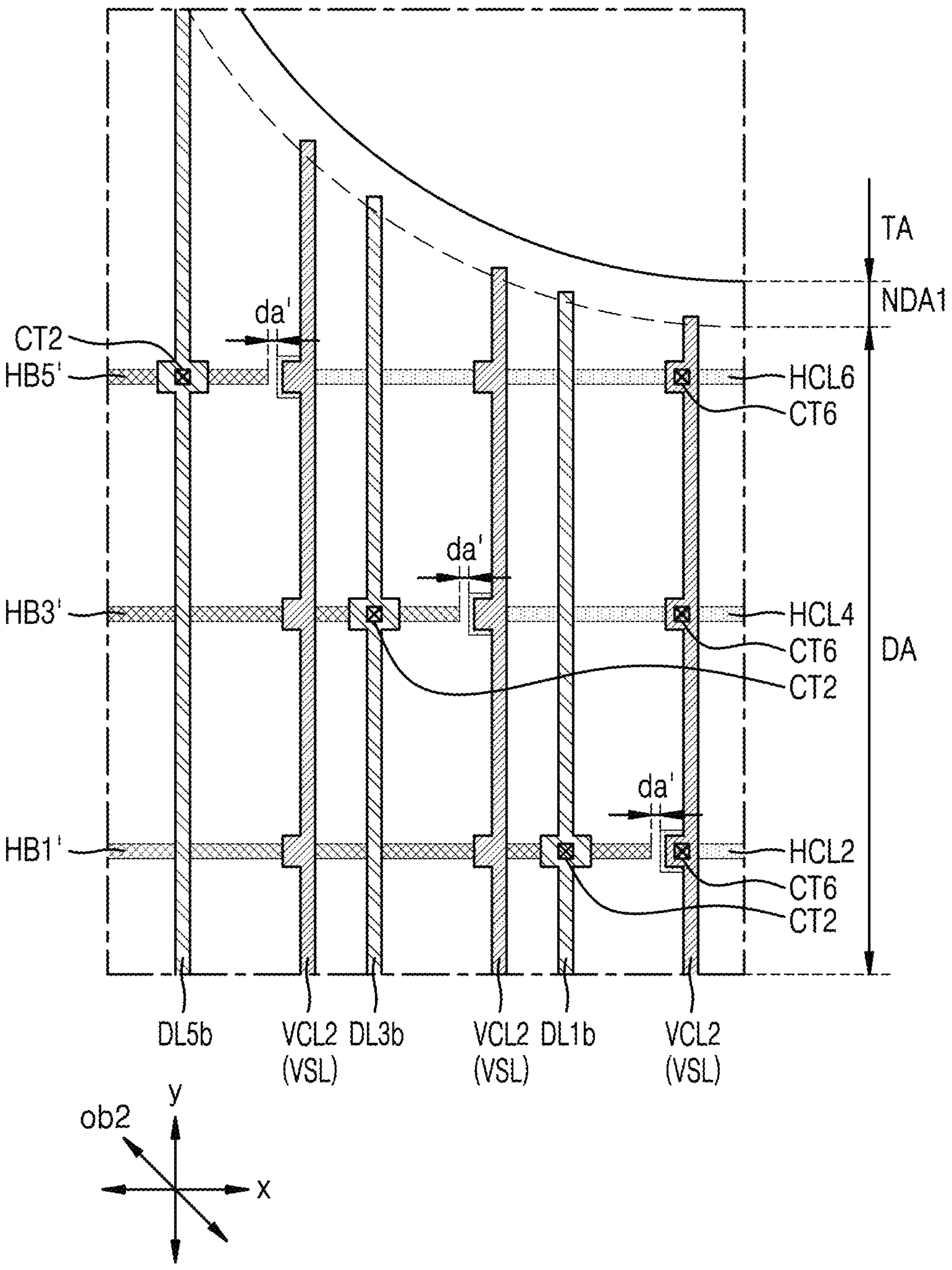
FIG. 12 is an enlarged plan view of a portion of a display panel according to an embodiment, showing a portion of the lower side of the transmissive area of FIG. 7.

FIG. 12 is an enlarged plan view of a portion of the display panel according to an embodiment, showing a portion of the lower side of the transmissive area of FIG. 7.

In an embodiment, as described above with reference to FIG. 7, the horizontal conductive lines arranged on the lower side of the transmissive area TA, for example, the second horizontal conductive line HCL2, the fourth horizontal conductive line HCL4, and the sixth horizontal conductive lie HCL6 shown in FIG. 12 may be electrically connected to the at least one second vertical conductive line VCL2 through the sixth contact hole CT6.

The first vertical conductive lines VCL1 on the upper side of the transmissive area TA described with reference to FIG. 8 may have a same voltage level as the vertical driving voltage line VDL, and the second vertical conductive line VCL2 on the lower side of the transmissive area TA may be the vertical common voltage line VSL as shown in FIG. 12. In such an embodiment, some of the vertical common voltage lines VSL may correspond to the second vertical conductive lines VCL2.

The second vertical conductive lines VCL2 may be disposed in a same layer as the first vertical conductive lines VCL1 described above with reference to FIG. 8. At least one second vertical conductive line VCL2 may be connected to the second horizontal conductive line HCL2, the fourth horizontal conductive line HCL4, and the sixth horizontal conductive line HCL6 through the sixth contact hole CT6, and the structure of the sixth contact hole CT6 is the same as that of the fifth contact hole CT5 described above with reference to FIG. 11. In an embodiment, for example, like the fifth contact hole CT5, the sixth contact hole CT6 may be formed in the second organic insulating layer 212 (see FIG. 11).

The horizontal conductive line and the horizontal bridge part of the bridge line arranged in a same row may be apart from each other. In an embodiment, for example, as shown in FIG. 12, the first horizontal bridge part HB1' may be apart from the second horizontal conductive line HCL2 by a second distance da'. The first horizontal bridge part HB1' and the second horizontal conductive line HCL2 may be disposed on the same layer (e.g., the first organic insulating layer) and be apart from each other by a second distance da'. The second distance da' may be the same as the first distance da described with reference to FIG. 11.

In such an embodiment, the third horizontal bridge part HB3' and the fourth horizontal conductive line HCL4 may be disposed in a same layer as each other and be apart from each other by the second distance da'. The fifth horizontal bridge part HB5' and the sixth horizontal conductive line HCL6 may be disposed in a same layer as each other and be apart from each other by the second distance da'.

Referring to FIGS. 8 to 12, in an embodiment, the first vertical conductive lines VCL1 on the upper side of the transmissive area TA have a same voltage level as that of the vertical driving voltage line VDL, and the second vertical conductive lines VCL2 on the lower side of the transmissive area TA have a same voltage level as that of the vertical common voltage line VSL, but the embodiment is not limited thereto. In an alternative embodiment, the first vertical conductive lines VCL1 and the second vertical conductive lines VCL2 may have a same voltage level as each other. In an embodiment, for example, each of the first vertical conductive lines VCL1 and the second vertical conductive lines VCL2 may have a same voltage level as the vertical driving voltage line VDL. Alternatively, each of the first vertical conductive lines VCL1 and the second vertical conductive lines VCL2 may have a same voltage level as the vertical common voltage line VSL.

Figure 13:
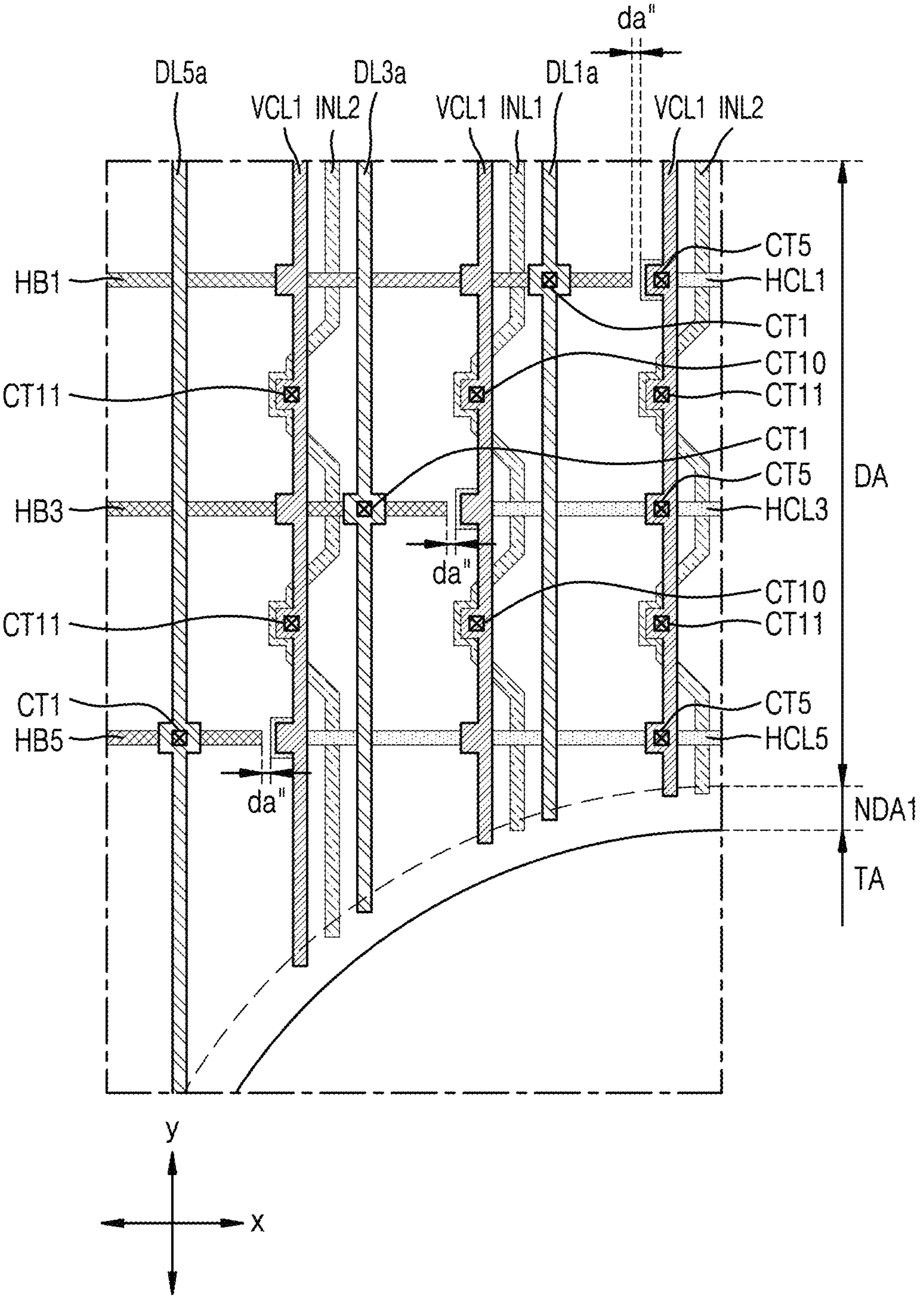
FIG. 13 is an enlarged plan view of a portion of a display panel according to an alternative embodiment, showing a portion of the upper side of the transmissive area of FIG. 7.

FIG. 13 is an enlarged plan view of a portion of the display panel according to an alternative embodiment, showing a portion of the upper side of the transmissive area of FIG. 7.

Referring to FIG. 13, in an alternative embodiment, the first vertical conductive line VCL1 may have a same voltage level as the first initialization voltage line INL1 or the second initialization voltage line INL2. The first initialization voltage line INL1 and the second initialization voltage line INL2 may each extend in the first direction (the y direction), and the first vertical conductive lines VCL1 may be electrically connected to the first initialization voltage line INL1 or the second initialization voltage line INL2.

In an embodiment, as shown in FIG. 13, some of the first vertical conductive lines VCL1 may be electrically connected to the first initialization voltage line INL1 through a tenth contact hole CT10, and the rest of the first vertical conductive lines VCL1 may be electrically connected to the second initialization voltage line INL2 through an eleventh contact hole CT11.

The first initialization voltage line INL1 and the second initialization voltage line INL2 may be disposed in a same layer (e.g., in a layer between the third interlayer insulating layer and the first organic insulating layer) as the vertical driving voltage line VDL (see FIG. 8) described above with reference to FIG. 8.

The horizontal conductive lines, for example, the first horizontal conductive line HCL1, the third horizontal conductive line HCL3, and the fifth horizontal conductive line HCL5 shown in FIG. 13, may be electrically connected to at least one of the first vertical conductive lines VCL1. In such an embodiment, as shown in FIG. 13, the first horizontal conductive line HCL1, the third horizontal conductive line HCL3, and the fifth horizontal conductive line HCL5 each are electrically connected to the second initialization voltage line INL2 through the fifth contact hole and connected to the first vertical conductive line VCL1 having a same voltage level as the second initialization voltage line INL2. In an alternative embodiment, the third horizontal conductive line HCL3, and the fifth horizontal conductive line HCL5 each are electrically connected to the first initialization voltage line INL1, and connected to the first vertical conductive line VCL1 having a same voltage level as the first initialization voltage line INL1.

The horizontal conductive line and the horizontal bridge part of the bridge line arranged in a same row as each other may be apart from each other. In an embodiment, for example, the first horizontal bridge part HB1 and the first horizontal conductive line HCL1 shown in FIG. 13 may be apart from each other by a third distance da ". The third horizontal bridge part HB3 and the third horizontal conductive line HCL3, and the fifth horizontal bridge part HB5 and the fifth horizontal conductive line HCL5 may be apart from each other by the third distance da".

Figure 14:
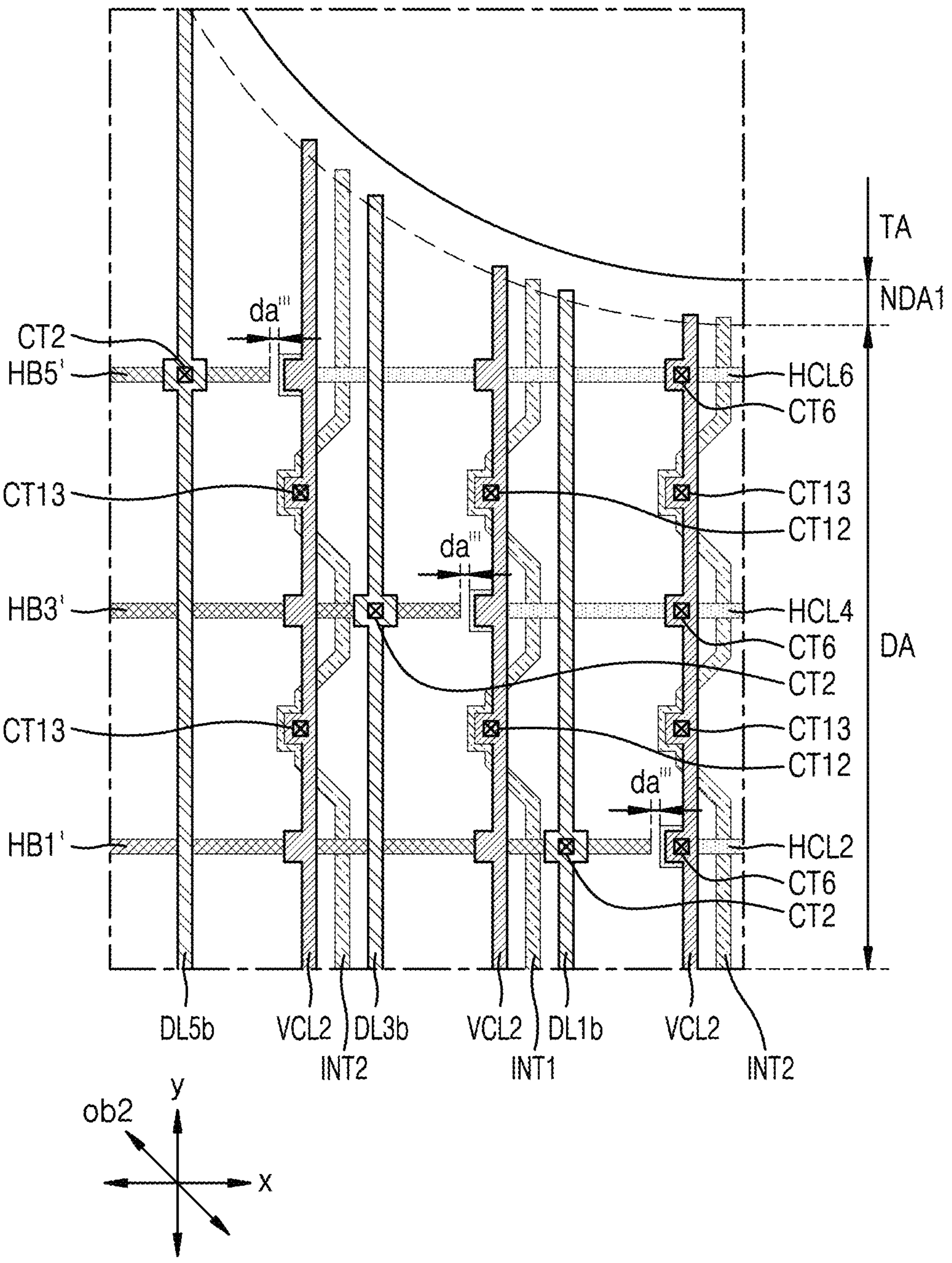
FIG. 14 is an enlarged plan view of a portion of a display panel according to an alternative embodiment, showing a portion of the lower side of the transmissive area of FIG. 7.

FIG. 14 is an enlarged plan view of a portion of the display panel according to an alternative embodiment, showing a portion of the lower side of the transmissive area of FIG. 7.

Referring to FIG. 14, in an alternative embodiment, the second vertical conductive line VCL2 may have a same voltage level as the first initialization voltage line INL1 or the second initialization voltage line INL2. The first initialization voltage line INL1 and the second initialization voltage line INL2 may each extend in the first direction (the y direction), and the second vertical conductive lines VCL2 may be electrically connected to the first initialization voltage line INL1 or the second initialization voltage line INL2.

In an embodiment, as shown in FIG. 14, some of the second vertical conductive lines VCL2 may be electrically connected to the first initialization voltage line INL1 through a twelfth contact hole CT12, and the rest of the second vertical conductive lines VCL2 may be electrically connected to the second initialization voltage line INL2 through a thirteenth contact hole CT13. The first initialization voltage line INL1 and the second initialization voltage line INL2 may be disposed in a same layer (e.g., in a layer between the third interlayer insulating layer and the first organic insulating layer) as the vertical driving voltage line VDL (see FIG. 8) described above with reference to FIG. 8.

The horizontal conductive lines, for example, the second horizontal conductive line HCL2, the fourth horizontal conductive line HCL4, and the sixth horizontal conductive line HCL6 shown in FIG. 14, may be electrically connected to at least one of the second vertical conductive lines VCL2. In an embodiment, as shown in FIG. 14, the second horizontal conductive line HCL2, the fourth horizontal conductive line HCL4, and the sixth horizontal conductive line HCL6 each are electrically connected to the second initialization voltage line INL2 through the sixth contact hole CT6 and connected to the second vertical conductive line VCL2 having a same voltage level as the second initialization voltage line INL2. In an alternative embodiment, the second horizontal conductive line HCL2, the fourth horizontal conductive line HCL4, and the sixth horizontal conductive line HCL6 each are electrically connected to the first initialization voltage line INL1, and connected to the second vertical conductive line VCL2 having a same voltage level as the first initialization voltage line INL1.

The horizontal conductive line and the horizontal bridge part of the bridge line arranged in a same row as each other may be apart from each other. In an embodiment, for example, the first horizontal bridge part HB1' and the second horizontal conductive line HCL2 shown in FIG. 14 may be apart from each other by a fourth distance da'''. The third horizontal bridge part HB3' and the third horizontal conductive line HCL3, and the fifth horizontal bridge part HB5' and the sixth horizontal conductive line HCL6 may be apart from each other by the fourth distance da'''. The fourth distance da''' may be the same as the third distance da''' described with reference to FIG. 13.

As described above, according to embodiments of the invention, a display panel which may display high-quality images by protecting the display panel from electrostatic discharge while reducing the area of a dead space, and an electronic apparatus including the display panel may be provided.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display panel, comprising:

a transmissive area;

a display area surrounding the transmissive area;

a plurality of data lines extending in a first direction, wherein the plurality of data lines comprise:

a first data line including a first part and a second part, wherein the first part and the second part of the first data line each extend in a first direction in the display area and are apart from each other with the transmissive area therebetween; and a second data line including a first part and a second part, wherein the first part and the second part of the second data line each extend in the first direction in the display area and are apart from each other with the transmissive area therebetween, a first bridge line electrically connecting the first part of the first data line to the second part of the first data line, wherein the first bridge line comprises:

a first sub-bridge part extending in a second direction crossing the first direction in the display area, and connected to the second part of the first data line via a first contact hole;

a second sub-bridge part connected to the first sub-bridge part via a second contact hole; and a third sub-bridge part connected to the second sub-bridge part and the first part of the first data line, and a second bridge line electrically connecting the first part of the second data line to the second part of the second data line, wherein the second bridge line comprises:

a fourth sub-bridge part extending in the second direction in the display area, and connected to the second part of the second data line via a third contact hole;

a fifth sub-bridge part connected to the fourth sub-bridge part via a fourth contact hole; and a sixth sub-bridge part connected to the fifth sub-bridge part and the first part of the second data line, wherein:

the first and second data lines are disposed at a first side of a central axis that passes through a center of the transmissive area in the first direction, the first data line is closest to the central axis at the first side of the central axis, and a first distance between the first and second contact holes is greater than a second distance between the third and fourth contact holes.

2. The display panel of claim 1, wherein:

the first contact hole and the third contact hole are arranged along a first oblique direction crossing the first and second directions, and the second contact hole and the fourth contact hole are arranged in a second oblique direction crossing the first and second directions and the first oblique direction.

3. The display panel of claim 1, wherein:

a length of the first sub-bridge part is greater than a length of the fourth sub-bridge part.

4. The display panel of claim 1, wherein:

the first sub-bridge part and the second sub-bridge part are disposed on different layers, and the fourth sub-bridge part and the fifth sub-bridge part are disposed on different layers.

5. The display panel of claim 4, wherein:

the first sub-bridge part and the fourth sub-bridge part are disposed on a same layer, the second sub-bridge part and the fifth sub-bridge part are disposed on a same layer, and, the third sub-bridge part and sixth sub-bridge part are disposed on a same layer.

6. The display panel of claim 1, wherein:

at least one of the plurality of data lines overlaps and crosses the first sub-bridge part of the first bridge line.

7. The display panel of claim 1, wherein the plurality of data lines further comprises:

a third data line including a first part and a second part, wherein the first part and the second part of the third data line each extend in the first direction in the display area and are apart from each other with the transmissive area therebetween; and a fourth data line including a first part and a second part, wherein the first part and the second part of the fourth data line each extend in the first direction in the display area and are apart from each other with the transmissive area therebetween, wherein:

the first part and the second part of the third data line are electrically connected to a third bridge line, and the first part and the second part of the fourth data line are electrically connected to a fourth bridge line, and the third and fourth data lines are disposed at a second side of the central axis of the transmissive area, the second side is opposite to the first side of the central axis, and the third data line is closest to the central axis at the second side of the central axis.

8. The display panel of claim 7, wherein:

the third bridge line comprises:

a seventh sub-bridge part extending in the second direction in the display area, and connected to the second part of the third data line via a fifth contact hole;

an eighth sub-bridge part connected to the seventh sub-bridge part via a sixth contact hole; and a ninth sub-bridge part connected to the eight sub-bridge part and the first part of the third data line, and the fourth bridge line comprises:

a tenth sub-bridge part extending in the second direction in the display area, and connected to the second part of the fourth data line via a seventh contact hole;

an eleventh sub-bridge part connected to the tenth sub-bridge part via an eighth contact hole; and a twelfth sub-bridge part connected to the eleventh sub-bridge part and the first part of the fourth data line, wherein a third distance between the fifth and sixth contact holes is greater than a fourth distance between the seventh and eight contact holes.

9. The display panel of claim 8, wherein:

the fifth contact hole and the seventh contact hole are arranged along a third oblique direction crossing the first and second directions, and the sixth contact hole and the eighth contact hole are arranged in a fourth oblique direction crossing the first and second directions and the third oblique direction.

10. The display panel of claim 8, wherein:

at least one of the plurality of data lines overlaps and crosses the seventh sub-bridge part of the third bridge line.

11. The display panel of claim 8, wherein:

the seventh sub-bridge part and the eighth sub-bridge part are disposed on different layers, and the fourth sub-bridge part and the fifth sub-bridge part are disposed on different layers.

* * * * *